United States Patent [19]

Cox et al.

[11] Patent Number: 5,050,189
[45] Date of Patent: Sep. 17, 1991

[54] MULTIBIT AMPLITUDE AND PHASE MODULATION TRANSCEIVER FOR LAN

[75] Inventors: William M. Cox; Michael A. Fischer, both of San Antonio; Charles Lawrence, Lytle, all of Tex.; Peter H. Halpern, Longwood; Larry W. Koos, Winter Park, both of Fla.

[73] Assignee: Datapoint Corporation, San Antonio, Tex.

[21] Appl. No.: 270,739

[22] Filed: Nov. 14, 1988

[51] Int. Cl.⁵ .................. H04L 5/12; H04L 23/02
[52] U.S. Cl. ........................ 375/39; 375/42; 375/18; 375/118; 370/105.3
[58] Field of Search ............... 375/8, 9, 42, 96, 106, 375/110, 111, 112, 113, 7, 39, 20, 118, 19; 370/18, 105.3, 108; 340/825.2

[56] References Cited

U.S. PATENT DOCUMENTS

| | | |
|---|---|---|
| 3,087,065 | 4/1963 | Mutschler . |
| 3,337,691 | 8/1967 | Litchman . |
| 3,482,101 | 12/1969 | Slaymaker . |
| 3,532,890 | 10/1970 | Denton . |
| 3,571,756 | 3/1971 | Skoog et al. . |
| 3,621,139 | 11/1971 | Gibson . |
| 3,689,699 | 9/1972 | Brenig et al. . |
| 3,733,550 | 5/1973 | Tazaki et al. . |
| 3,755,676 | 8/1973 | Kinsel . |
| 3,775,688 | 11/1973 | Hinoshita et al. . |
| 3,851,252 | 11/1974 | Karnaugh et al. . |

(List continued on next page.)

OTHER PUBLICATIONS

800 MB/S PCM Multilevel Transmission System over Coaxial Cables by Aratoni & Fukinuki.
Excerpt of Chapter 2 from "A Commonsense Approach to the Theory of Error Correcting Codes", Benjamin Arazi, The MIT Press, 1988.
Excerpt from "Error Detecting Codes, Self-Checking Circuits and Applications", by John Wakerly, 1982.
Excerpt of "Microcomputer Interfacing", by Harold S. Stone, 1983.
Excerpt from: "Circuits and Application Seminar", by Fairchild pertaining to Data Synchronizer, published 1982.
"Anomalous Behavior of Synchronizer and Arbiter Circuits", by Thomas J. Chaney and Charles E. Molnar published in an unknown publication.
Article, "Designers Confront Metastability in Boards and Buses", by John Beaston and R. Scott Tetrick, *Computer Design*, Mar. 1, 1986.

*Primary Examiner*—Douglas W. Olms
*Assistant Examiner*—Ralph Smith
*Attorney, Agent, or Firm*—John R. Ley

[57] ABSTRACT

A transceiver for a LAN is capable of communicating multiple bits per signal element to increase the data throughput of the LAN. The transceiver includes a transmitter which receives a multiple bit digital input value originating at a node of the LAN at which the transceiver is present. The transmitter converts the multiple bit digital input signal into a pulse-like analog signal which is amplitude and phase modulated. A receiver of a transceiver at a receiving node the transmitted analog signal converts its amplitude and phase into a corresponding multiple bit digital output value. A time-domain filter of the receiver creates a primary signal from the received analog signal. To sample the primary signal at its maximum amplitude point, a derivative of the primary signal waveform is used to establish the zero derivative point at which the primary signal attains its maximum amplitude, and to establish a fixed sampling point for subsequent signals. The sampling point is synchronized in phase with the stream of received analog signals. The residual intersymbol interference (ISI) effect of preceding signals on the LAN medium is eliminated prior to converting the primary signal to the digital value. To adjust and compensate for attenuation and amplification created by the LAN medium, the signal values are normalized.

56 Claims, 7 Drawing Sheets

U.S. PATENT DOCUMENTS

| | | | |
|---|---|---|---|
| 3,897,887 | 8/1975 | Goldberg. | |
| 3,979,561 | 9/1976 | Hinkle et al.. | |
| 3,985,423 | 10/1976 | Tseng. | |
| 4,062,618 | 12/1977 | Steensoma. | |
| 4,101,734 | 7/1978 | Dao. | |
| 4,161,628 | 7/1979 | McRae. | |
| 4,206,320 | 6/1980 | Keasler et al.. | |
| 4,258,433 | 3/1981 | Herschtal et al. | 370/24 |
| 4,326,289 | 4/1982 | Dickinson | 370/85 |
| 4,339,818 | 7/1982 | Gruenberg | 370/112 |
| 4,348,075 | 9/1982 | Gottlieb et al. | 350/96.13 |
| 4,386,323 | 5/1983 | Jansen | 328/63 |
| 4,451,827 | 5/1984 | Kahn et al. | 340/825.52 |
| 4,534,040 | 8/1985 | Thopar | 375/39 |
| 4,564,023 | 1/1986 | Stahler | 375/42 X |
| 4,575,860 | 3/1986 | Scordo | 375/110 |
| 4,597,090 | 6/1986 | Forney, Jr. | 375/39 |
| 4,599,732 | 7/1986 | LeFever | 375/13 |
| 4,602,365 | 7/1986 | White et al. | 370/89 |
| 4,649,535 | 3/1987 | Ulug | 370/86 |
| 4,675,671 | 6/1987 | Ishizuka et al. | 340/825.05 |
| 4,675,880 | 6/1987 | Davarian | 375/39 |
| 4,700,185 | 10/1987 | Balph et al. | 340/825.06 |
| 4,701,905 | 10/1987 | Un et al. | 370/18 |
| 4,701,908 | 10/1987 | Ikeda | 370/85 |
| 4,713,817 | 12/1987 | Wei | 371/43 |
| 4,752,924 | 6/1988 | Darnell et al. | 370/86 |
| 4,756,007 | 7/1988 | Qureshi et al. | 375/37 |
| 4,757,497 | 7/1988 | Beierle et al. | 370/89 |
| 4,771,286 | 9/1988 | Niessen et al. | 340/825.52 |
| 4,780,889 | 10/1988 | Ley et al. | 375/106 |
| 4,782,482 | 11/1988 | Kiatipov et al. | 370/86 |
| 4,789,982 | 12/1988 | Coden | 370/85 |
| 4,792,944 | 12/1988 | Takahashi et al. | 370/84 |
| 4,797,879 | 1/1989 | Habbab et al. | 370/89 |
| 4,821,296 | 4/1989 | Cordell | 375/119 |
| 4,841,551 | 6/1989 | Avaneas | 375/118 |
| 4,855,997 | 8/1989 | Wilson et al. | 370/85 |
| 4,896,338 | 1/1990 | Rouillet et al. | 375/119 |
| 4,907,224 | 3/1990 | Scoles et al. | 370/85.2 |

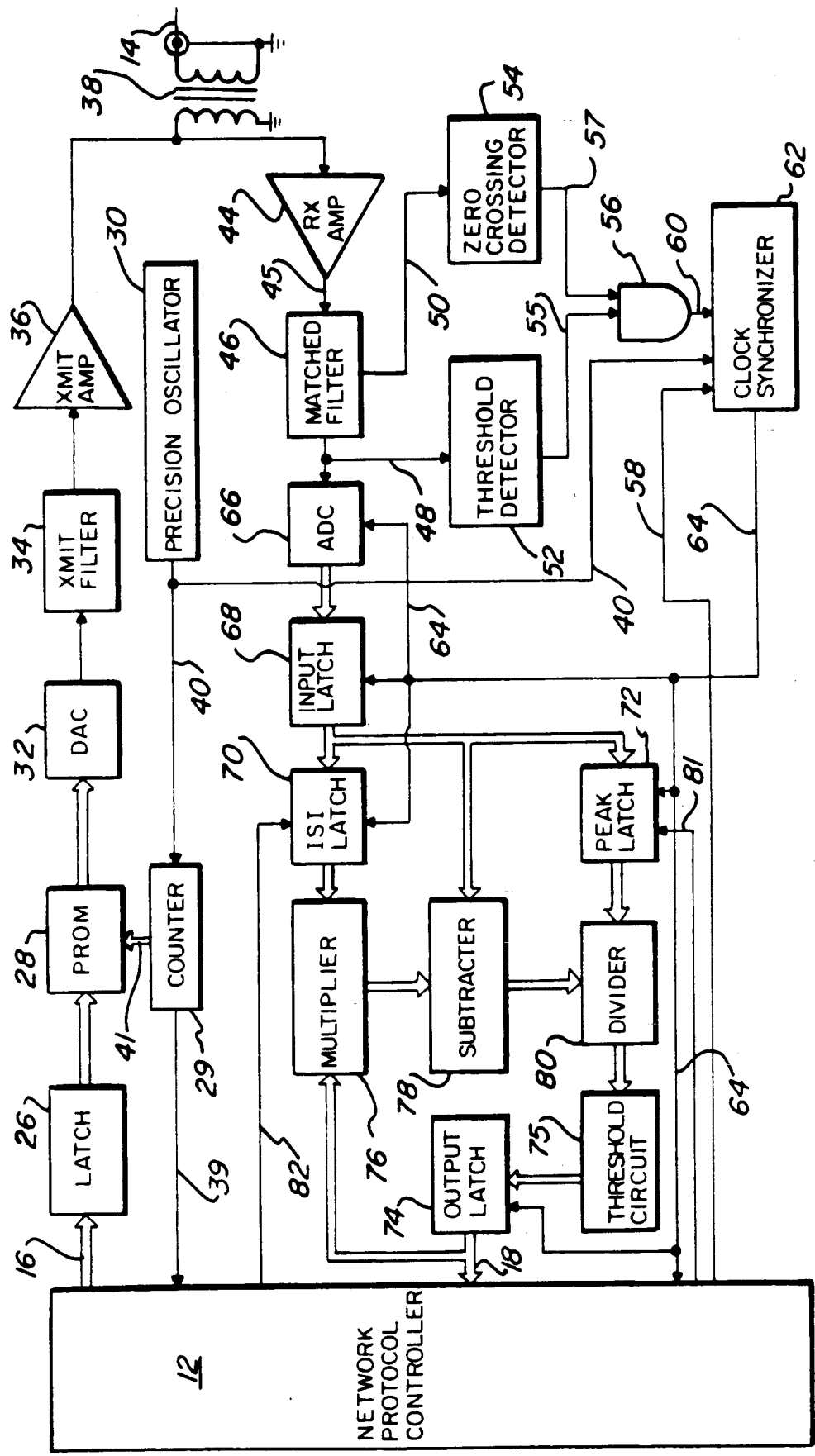
Fig_1

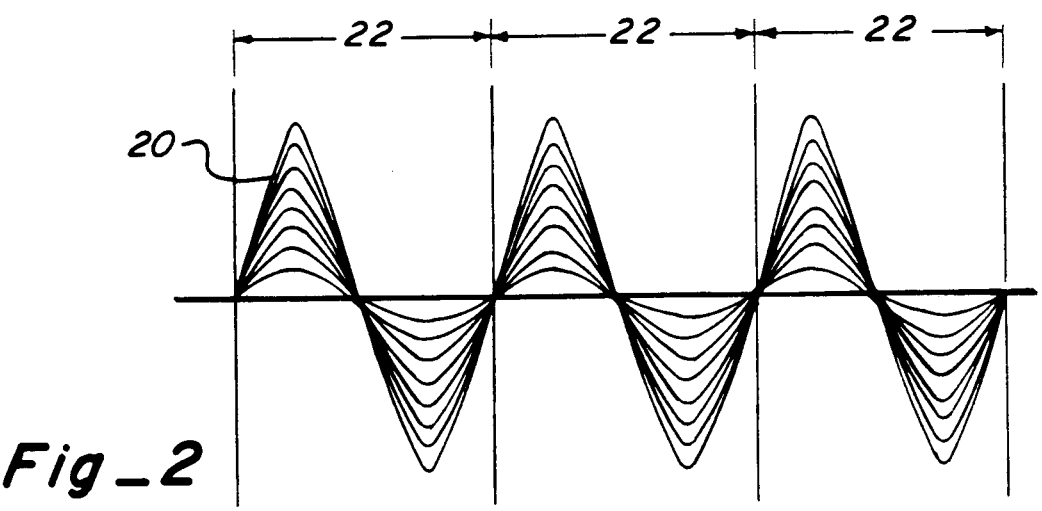
Fig_2
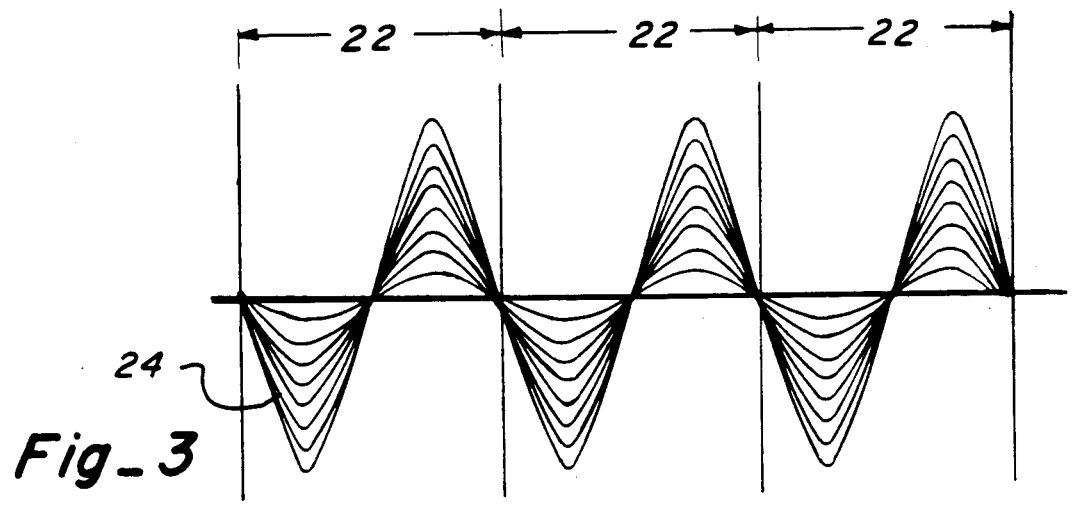
Fig_3

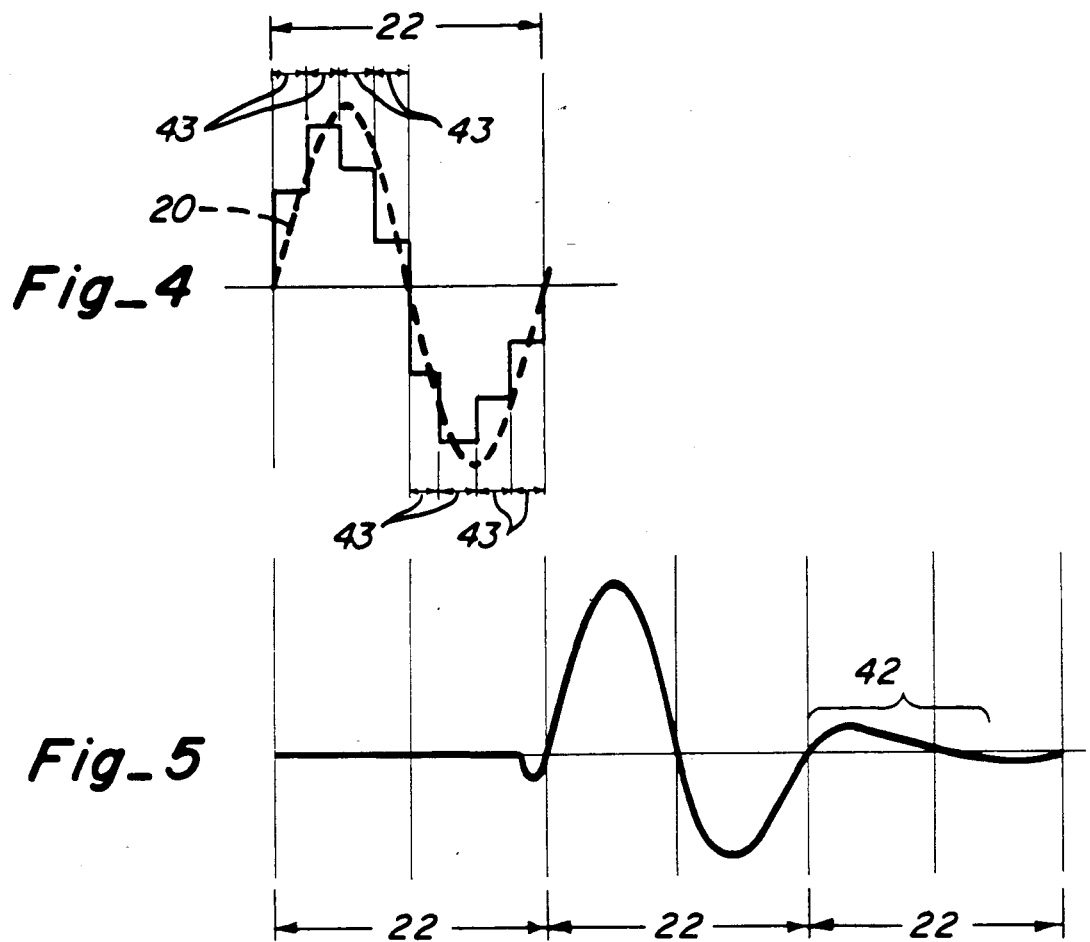
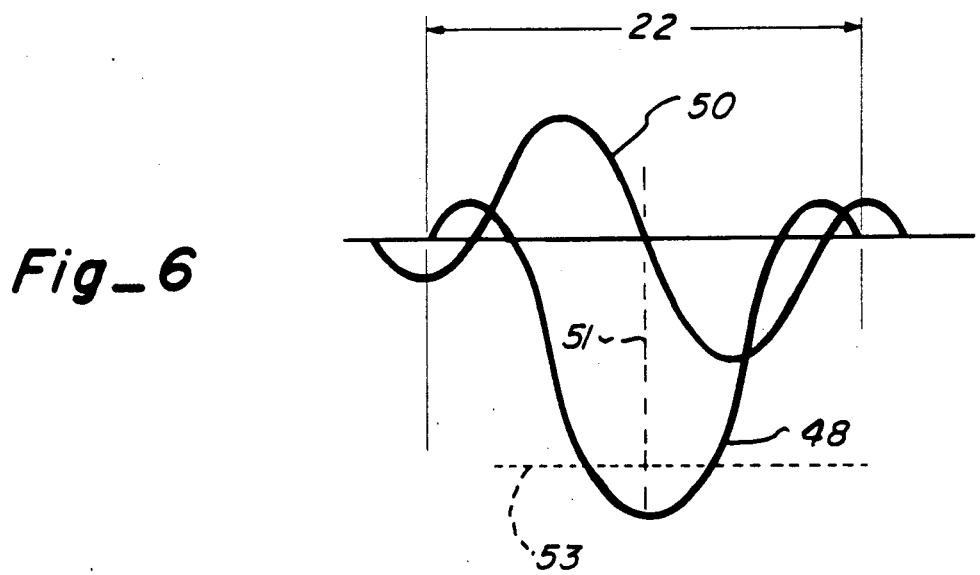

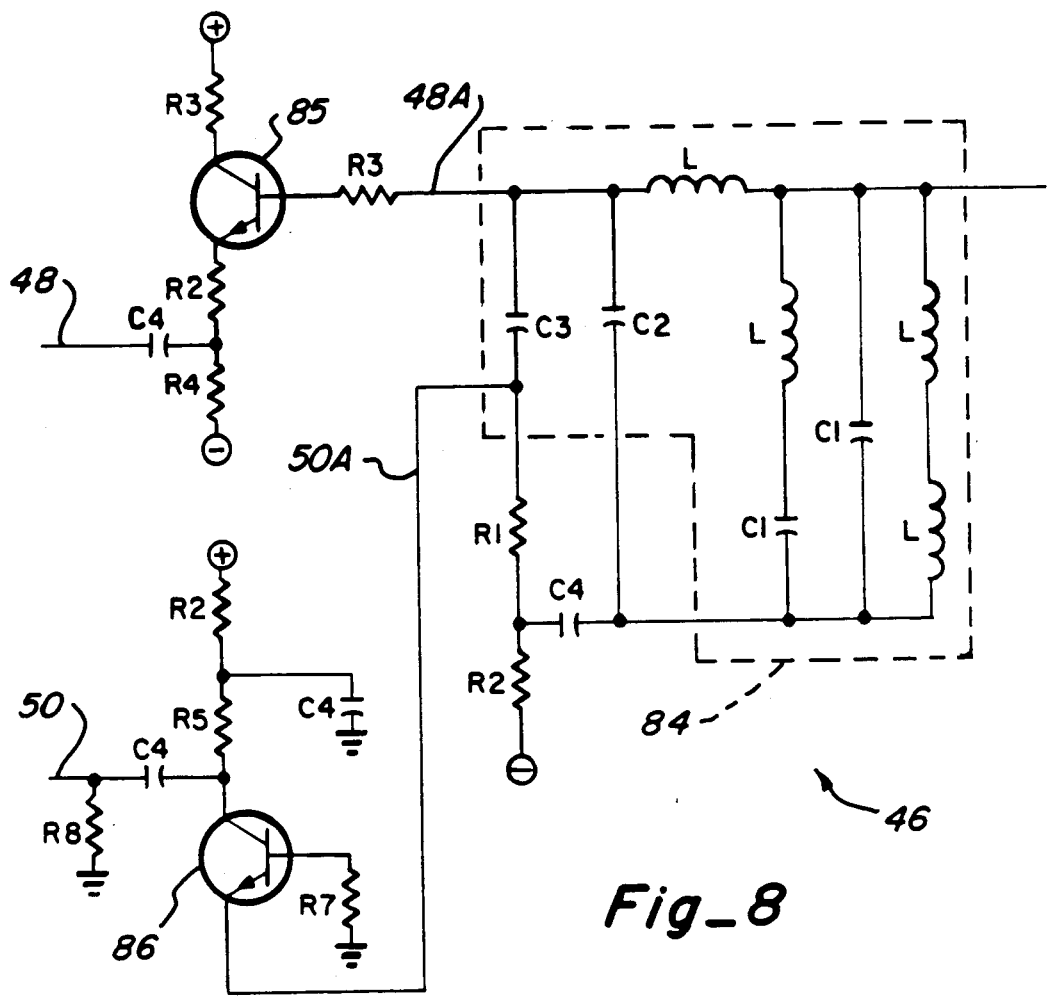
Fig_8
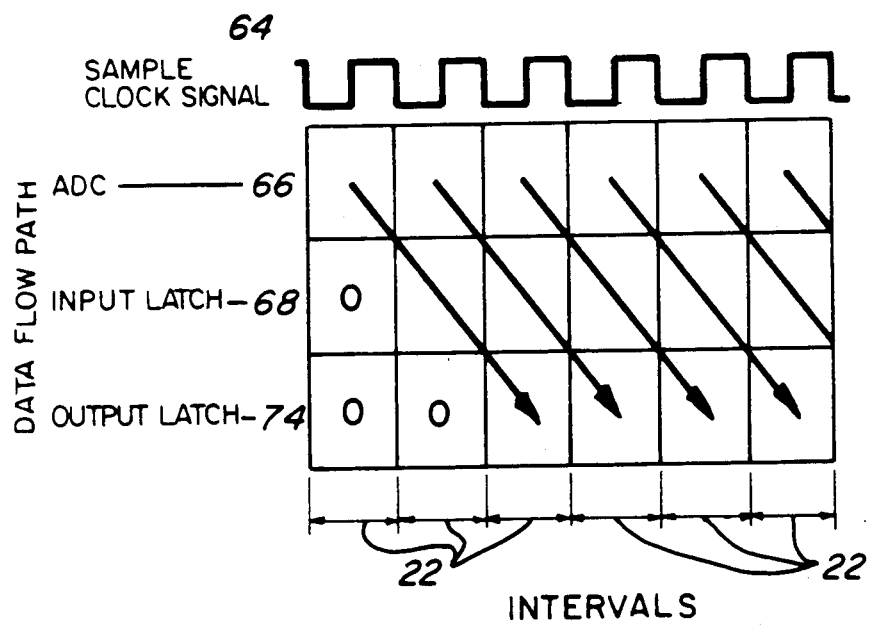
Fig_7

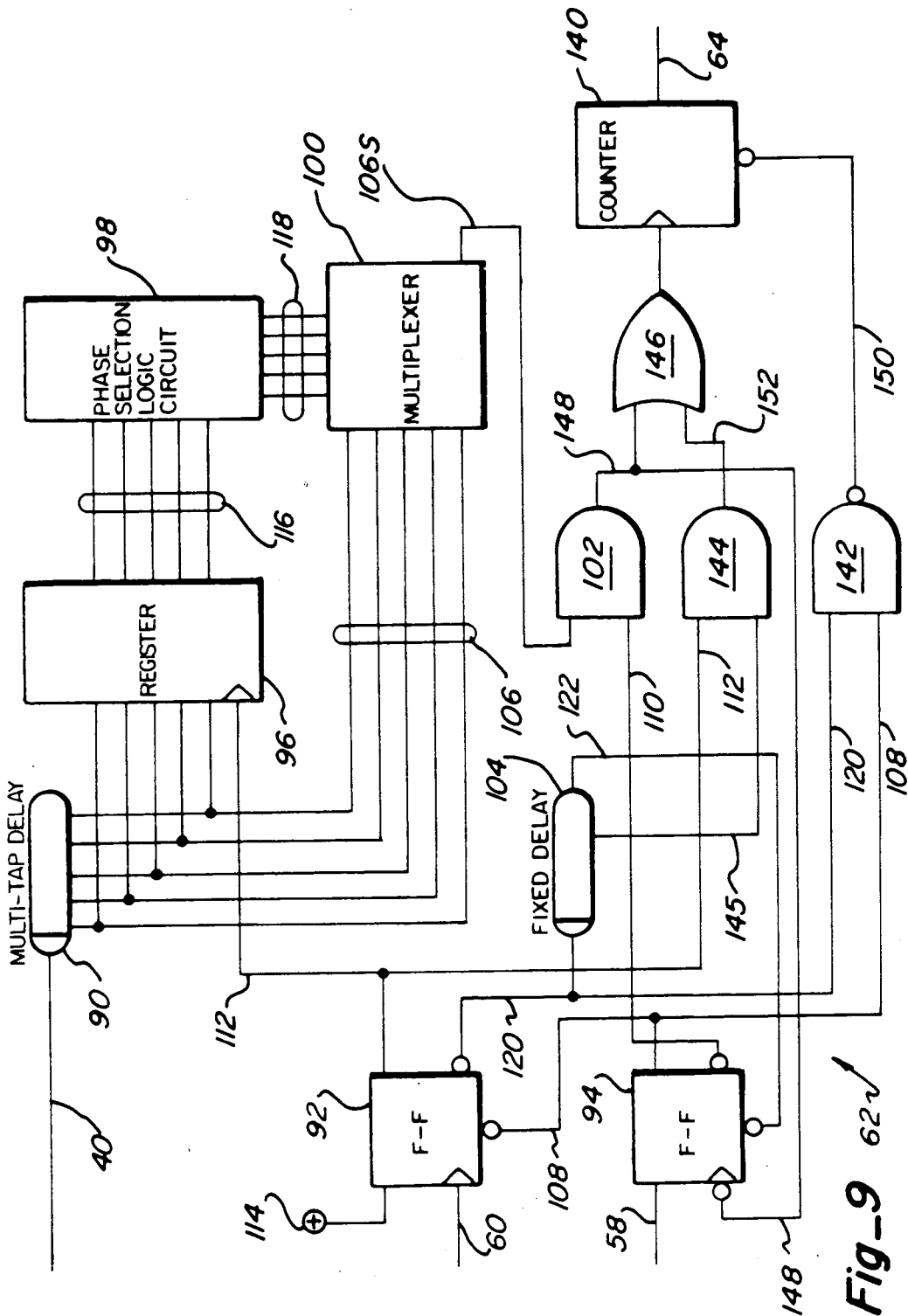
Fig_9

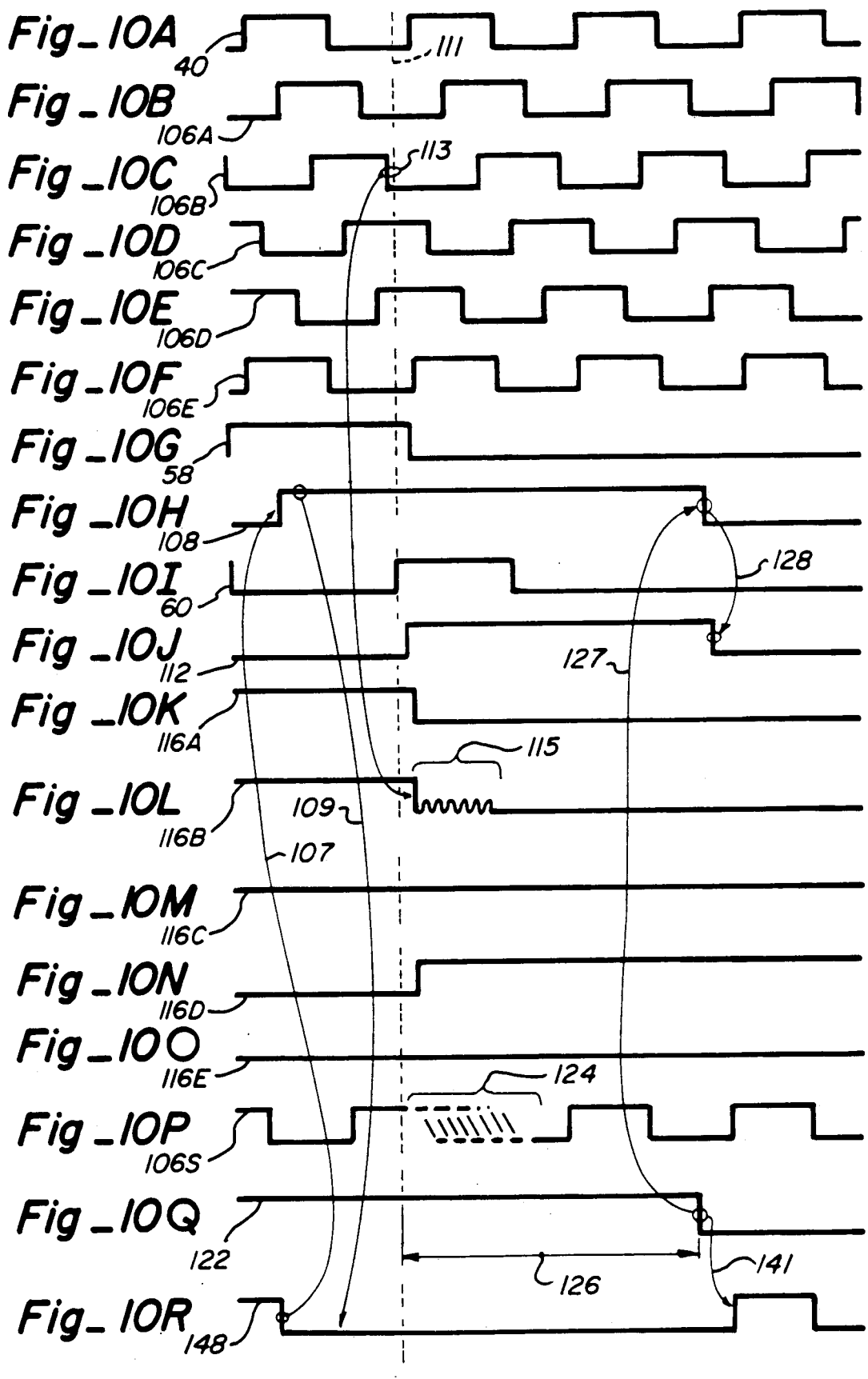

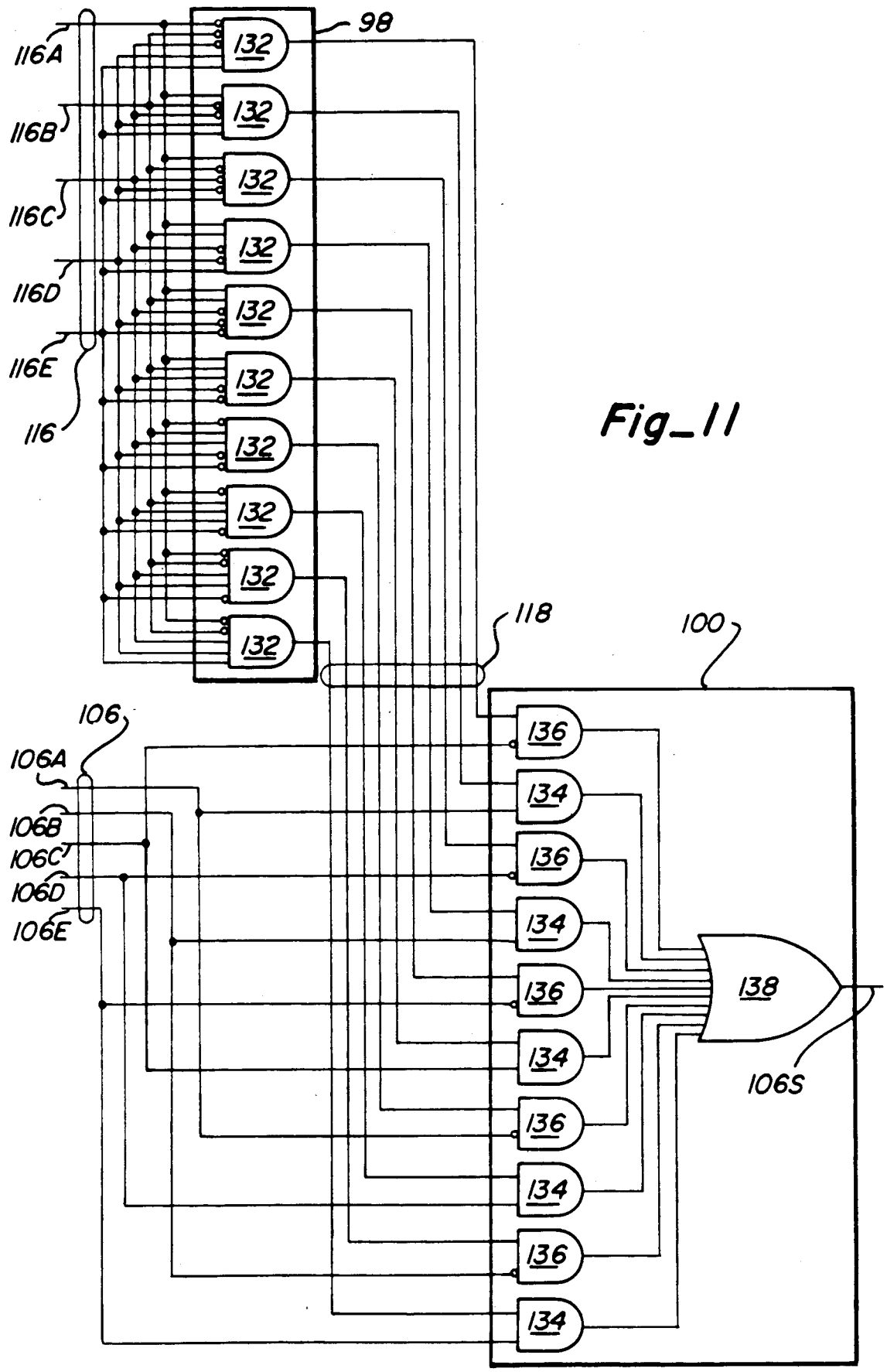
Fig_11

MULTIBIT AMPLITUDE AND PHASE MODULATION TRANSCEIVER FOR LAN

This invention relates to a transceiver for a local area network (LAN or network), and more particularly to a new and improved transceiver which operatively transmits multiple bits per signal element by amplitude and phase modulation, to increase the data throughput of the LAN.

CROSS-REFERENCE TO RELATED APPLICATIONS

The disclosures of three other United States patent applications, filed concurrently herewith and assigned to the assignee hereof, relate to this application: LAN WITH DYNAMICALLY SELECTABLE OPERATIONAL CAPABILITIES, Ser. No. 07/270,804, filed on Nov. 14, 1988, now abandoned and LAN WITH INTEROPERATIVE MULTIPLE OPERATIONAL CAPABILITIES, Ser. No. 07/270,641, filed on Nov. 14, 1988, now U.S. Pat No. 5,008,879. The disclosures of these applications are incorporated herein by this reference.

BACKGROUND OF THE INVENTION

Recently LANs have taken on added significance in the field of computer systems. Current advancements point to the desirability of interconnecting computers on an organization-wide basis to obtain better sharing of computing capacity. LANs are the means by which computers are typically interconnected on an effective basis for this purpose. However, the data throughput capacities of many LANs must be increased in order to effectively link high capacity devices such as file servers and computational accelerators.

The usual technique for transferring data over a network is to transmit a single digital bit with a single pulse or signal applied to the communication medium, thus transferring one digital bit per signal element. Increasing the data transfer rates by increasing the signaling frequency will generally prove unsuitable because the communication protocol of the network will generally not permit a changed signaling rate, and in many cases, the network communication medium (cables, etc.) will not adequately or reliably support transfer data at higher rates.

Attempts have been made to increase data throughput of a LAN by amplitude modulating the transmitted signals, in order to convey multiple digital bits per signal element. Amplitude modulating the signals results in the signal amplitude, not the presence or the absence of the signal, representing a digital code consisting of multiple bits. For example, by modulating the amplitude of the signal in eight discrete amplitudes or gradations, it is possible to communicate three digital bits of information by each amplitude modulated signal. In this example, amplitude modulation will convey three times as much digital information per signal element compared to the commonly used technique of communicating a single bit per signal element. U.S. Pat. No. 4,602,365 discloses an example of an amplitude modulated LAN. Another example is contained in abandoned U.S. patent application Ser. No. 466,075, filed Feb. 14, 1983.

Attempts at amplitude modulating the signals on a LAN appear to have either not succeeded in actual practice or have met with such limited utility that amplitude modulation techniques for LANs have not achieved widespread commercial use. Perhaps the failures or limited utility of such previous attempts can be explained by the failure to appreciate many of the factors involved in the improvements of the present invention.

Accurate synchronization to the incoming stream of signal elements is required to communicate effectively by amplitude modulating signals over a LAN. Since the amplitude of the received signal represents a digital code, it is necessary to accurately sample the maximum amplitude of the received signal in order to accurately decode its level or amplitude. If the amplitude of the received signal is not accurately sampled at its maximum amplitude because of phase errors in synchronization, inaccurate data decoding will result. Each of the gradations of amplitude in the signal must be reliably detected and distinguished from one another and from noise and other spurious effects on the network medium. Even if the received signal is accurately sampled at its maximum point, the effects on the signal created by the resistance, reactivity, and integrity of the communication medium, by noise, and by amplification created by LAN repeaters, influence the amplitude of each signal when it is received. The residual effects of the previous signal can also influence the amplitude of the next signal. This residual effect, known as intersymbol interference, can effectively change the amplitude of the next signal to an undesired value unless the effects of the intersymbol interference are eliminated from the received signal. The amplitude or gradation difference between different signal levels could theoretically be increased to make the amplitude of each discrete signal easier to discriminate, but there are practical limitations to the maximum signal amplitude which can be conducted by the network medium. It is possible to increase the gradations between each amplitude without unnecessarily increasing the maximum signal levels, but only by decreasing the number of available amplitudes for each signal pulse. Decreasing the available number of acceptable amplitude gradations reduces the amount of data which can be transferred with each signal, which is a result counter to the objective of increasing the amount of data transferred per signal element. Noise, distortion and spurious effects may achieve amplitude levels comparable to the lower levels of the amplitude modulated signals. It is therefore essential to be able to distinguish the lower level signals from the noise and distortion. A more complete discussion of these considerations involved in the improvements available from the present invention is presented below.

SUMMARY OF THE INVENTION

The present invention is directed to a transceiver for a LAN which can transmit and receive amplitude and phase modulated signal pulses. The phase modulation is effectively used to increase the gradations in amplitude for each signal pulse, or to increase the number of digital values communicated by each signal pulse, also called a signal element or symbol. Discrimination and decoding of the discrete amplitudes becomes easier, or more data can be conveyed within a given range of discrete amplitudes of the signal element, as a result of phase modulation in addition to amplitude modulation. The transceiver also effectively synchronizes to the received stream of signal element and periodically resynchronizes, without requiring the LAN communication protocol to employ lengthy preambles in the transmitted frames and without requiring the use of complex phase-locked loop or other complex synchronizing arrangements. The synchronization causes each of the received signals to be reliably sampled at its maximum amplitude point, thereby allowing the digital value which the signal represents to be more accurately detected. The transceiver automatically compensates for the effects of attenuation and amplification, thereby adding more reliability in distinguishing and decoding the amplitude of the signals. The intersymbol interference effect is also effectively eliminated when decoding the received signals. Noise and spurious signals of comparable amplitudes to the low level amplitude modulated signals are effectively attenuated to avoid substantial errors in communication.

In accordance with these and other aspects, the improved transceiver of the present invention is part of a node of a LAN, and includes a transmitter means and a receiver means. The transmitter means at a source node receives a multiple-bit, digital input signal, converts the digital input signal into an amplitude and phase modulated signal, and transmits the signal over the communication medium which interconnects all of the nodes of the LAN. The receiver means of another transceiver at a receiving node receives the signal after it has passed over the medium, converts the signal into a digital output signal which has a bit pattern that corresponds to the predetermined bit pattern of the digital input signal at the source node, and supplies the digital output signal to the other elements of the receiving node.

The signal transmitted and received is preferably an analog pulse-like signal which has characteristics similar to sine wave, hereinafter referred to as a sine pulse. The receiver means includes filter means to accept sine pulses of the appropriate pulse shape and frequency and supplies a primary output signal in response, while rejecting noise and all other types of signals not having the predetermined time domain characteristics of the sine pulse. The receiver means also includes means responsive to the derivative of the primary output signal from the filter means to establish the point at which the amplitude of the primary signal from the filter means is at a maximum, either positively or negatively. Since the derivative of the primary signal is zero at the time when the primary signal is at maximum amplitude, the receiver means uses the zero value of the derivative signal to establish a sampling point at which to sample and convert the analog level of the primary signal to the digital output signal.

Calibration sine pulses of maximum amplitude and predetermined phase are preferably periodically inserted into the stream of data sine pulses transmitted in each frame communicated. Each calibration pulse is preceded and followed by an interval of silence or lack of signal. The transceiver includes means for detecting the amount of residual signal effect remaining on the communication medium during the silent interval following the calibration pulse. The amount of residual signal effect relative to the amplitude of the calibration pulse establishes a compensation factor for eliminating the effects of intersymbol interference for all subsequent symbols when converting to the digital output signal. The silent interval preceding the calibration pulse eliminates any intersymbol interference effect on the calibration pulse, thus allowing the amplitude of the calibration pulse to be unaffected by intersymbol interference.

The effects of attenuation or amplification by the LAN medium are also automatically accounted for by normalizing the magnitude of each received symbol relative to the magnitude of the calibration pulse. The normalization, which is a division of a value representative of the received symbol by the magnitude of the calibration pulse, has the effect of automatically adjusting the gain to a value which does not distort the magnitude of each received symbol compared to the amplitude at which it was transmitted.

The calibration pulses also contribute to synchronizing the phase of the sampling point location relative to the stream of received symbols or sine pulses. A synchronizer means of the receiver means generates a sample clock signal which occupies a predetermined fixed phase relationship with the maximum amplitude points of each symbol of the stream of received symbols. The calibration pulses are inserted on a sufficiently frequent basis to achieve reliable sampling point synchronization without use of lengthy preambles, complex phase locked loops, or the like. Compensation for or elimination of the dynamic effects of variable attenuation, distortion, time base instability and intersymbol interference occurs continuously as a result of the periodic insertion of the calibration pulses.

The improved transceiver described herein also has the advantage that it is interoperable with a conventional LAN transceiver which does not employ amplitude and phase modulation, but transmits and receives a single bit per symbol by sending a sine pulse which is only one of the available group of amplitude and phase modulated sine pulses. It is possible, therefore, that both conventional and improved transceivers of the described type can co-exist on the same LAN, to enable data communication between LAN nodes with improved transceivers at a higher rate while still allowing data communication with conventional LAN nodes with conventional transceivers at the conventional rates.

The actual scope of the present invention is defined by the appended claims. A better understanding of the present invention can be gained by reference to the following detailed description taken in conjunction with the accompanying drawings.

BRIEF DESCRIPTION OF THE DRAWINGS

FIG. 1 is a block diagram of the improved transceiver of the present invention connected between a network protocol controller of a LAN node and a LAN communication medium.

FIG. 2 is a generalized illustration of multiple, different-amplitude, sine pulse waveforms which commence with a positive half cycle and which end with a negative half cycle, which are transmitted and received by the transceiver shown in FIG. 1.

FIG. 3 is a generalized illustration of multiple, different-amplitude, sine pulse waveforms which commence with a negative half cycle and end with a positive half cycle, which are also transmitted and received by the transceiver shown in FIG. 1, and which are illustrated on the same time reference axis as that shown in FIG. 2.

FIG. 4 is an illustration of the simulation of one waveform shown in FIG. 2 in eight segments or steps and the smoothing effect on the simulation (shown by dashed lines) achieved by a transmit filter of the transceiver shown in FIG. 1.

FIG. 5 is a representation of an actual sine pulse waveform or "dipulse" which forms a calibration pulse that is transmitted and received by the transceiver shown in FIG. 1.

FIG. 6 illustrates a primary signal waveform and its negative derivative signal waveform supplied by a matched filter of the receiver shown in FIG. 1, in response to the reception of a sine pulse shown in FIG. 5. The primary and derivative waveforms are shown on a common time axis which is expanded relative to the time axis shown in FIG. 5.

FIG. 7 is a timing-event chart illustrating by arrows a "pipelined" flow of digital values during sequential intervals through an analog-to-digital converter, a data latch, and an output latch of the transceiver shown in FIG. 1, with reference to a sample clock signal also present in the transceiver shown in FIG. 1.

FIG. 8 is a schematic diagram of a matched filter which is present in the transceiver shown in FIG. 1.

FIG. 9 is a block diagram of a clock synchronizer of the transceiver shown in FIG. 1.

FIGS. 10A to 10R are waveform diagrams illustrating examples of the waveforms of signals present in the clock synchronizer shown in FIG. 9.

FIG. 11 is a diagram of logic components which illustrate the logical equations and functions of a phase logic selection circuit and a multiplexer of the clock synchronizer shown in FIG. 9.

DETAILED DESCRIPTION

A presently preferred embodiment of the transceiver of the present invention is shown and is referenced 10 in FIG. 1. The transceiver 10 is connected between a network protocol controller 12 and a network communication medium link element 14, such as a coaxial cable. The transceiver 10 forms a part of a node of the LAN. In LAN terminology, a node includes a device (not shown) which is connected to the LAN, and all of the interface equipment necessary for conveying data from that device over the medium 14, and for receiving signals from the medium 14, and for converting the received signals into data suitable for presentation to the device associated with the node. Examples of devices at a node include a personal computer, a work station, a file server computer, or a network connected I/O device, interface, sensor or actuator, or any other device which transmits and/or receives data over the medium 14. Communications over the medium are between a node transmitting the signals, referred to herein as a transmitting or source node, and another node which receives the signals, referred to herein as a receiving or destination node.

The network protocol controller 12 operatively receives data from the device associated with the node, reorders or otherwise modifies that data in accordance with a predetermined LAN communication protocol, and applies that data as a multiple-bit, digital input value or signal over an input data path 16 to the transceiver 10. The digital input value at 16 is a four-bit digital data signal in the preferred embodiment. A one-bit inhibit signal is also present at 16 with the four-bit digital data signal. The one-bit inhibit signal is used for the purposes described below.

A transmitter means of the transceiver 10 at the transmitting node receives each digital input value from the network protocol controller 12, converts the bit pattern of the digital input value into one of the amplitude and phase modulated sine pulses shown in FIGS. 2 and 3, and transmits the sine pulse over the medium 14. A receiver means of the transceiver 10 at the receiving node receives the sine pulse from the medium 14, and decodes the amplitude and phase information from the sine pulse to create a four-bit digital output value which corresponds to the predetermined bit pattern of the digital input value, and supplies the digital output value in an output data path 18 to the network protocol controller 12. The network protocol controller communicates data to and from the device connected to the node.

In addition to creating and decoding the phase and amplitude modulated analog signals, the receiver means also corrects for gain (amplification or attenuation) and other signal distortions created by the preceding signal and by the medium 14, and effectively synchronizes its operation to the incoming stream of signals from the medium 14, in a new and improved, more efficient and reliable manner, as described below.

FIGS. 2 and 3 generally illustrate the various types of amplitude and phase modulated sine pulse signal waveforms transmitted to and received from the medium 14. FIG. 2 illustrates a series of waveforms 20 which are applied during consecutive equal length time intervals 22. FIG. 3 illustrates a series of waveforms 24 applied during the intervals 22 which are phase inversions of the waveforms 20 illustrated in FIG. 2. The waveforms 20 and 24 are generally illustrated as pure sine waves. In reality the signals applied to the network medium are more in the nature of a sine pulse or dipulse (one of which is more accurately shown in FIG. 5), wherein the leading half cycle is similar to a half cycle of a sine wave, but the following half cycle is attenuated somewhat compared to the preceding sine wave half cycle. For convenience of illustration, the sine pulse is represented by the waveforms 20 or 24.

The sine pulses are each modulated into eight discrete amplitude levels as shown by the waveforms 20 an 24. Since the transceiver 10 can transmit and receive any of the waveforms 20 and 24, 8 different signal amplitude levels at each of two different phases are available for conveying 16 different data values. These 16 distinct signals or signal states encode all 16 possible binary code bit patterns from 0000 to 1111. Each of the discrete waveforms 20 and 24 represents a separate symbol. Each symbol encodes four bits of data, and each symbol therefore represents one four bit digital value. The transceiver 10 is thus capable of transmitting and receiving four bits per signal element, each signal element being one of the symbols shown by the waveforms 20 or 24. The absence of a waveform 20 or 24 is a silence symbol or interval 22 of silence.

By utilizing phase modulation as well as amplitude modulation, a greater difference or gradation between adjacent amplitude levels of the waveforms 20 and 24 is available, for a given peak-to-peak maximum amplitude. This improves the ability of the receiver to discriminate between each of the 16 symbols. If phase modulation was not employed, the 16 different amplitude levels would have to be separated by a much smaller gradation, assuming a constant amplitude for the maximum amplitude sine phase. Without using phase modulation, reliable discrimination of the amplitude levels would be much more difficult or impossible. Additional phase relationships can be utilized in cases where more than four bits are encoded by each symbol.

The use of amplitude and phase modulation to convey multiple bits (in the preferred embodiment, four) per signal element multiplies the amount of data which may be transferred for each signal element applied to the LAN medium. In most typical LANs, each signal element conveys only a single bit of information. In order to effectively communicate multiple bits per signal element, it is necessary to be able to accurately detect the symbol transmitted and distinguish it from the other symbols which can be somewhat closely related in amplitude.

The transmitter means of the transceiver 10, shown in FIG. 1, includes a latch 26, a programmable read only memory (PROM) 28, a counter 29, a high speed precision oscillator 30, a digital to analog converter (DAC) 32, a transmit filter 34, a transmit amplifier 36, and a transformer 38.

The latch 26 holds the four-bit digital input value and a one-bit inhibit value from the controller 12. The primary purpose of the latch 26 is to establish the proper timing between the data presented by the controller 12 and the use of that data by the transmitter means of the transceiver 10.

The four-bit data value from the latch 26 is applied to the high order input addresses of the PROM 28. A reference clock signal at 40 from the high speed oscillator 30 is applied to the counter 29. The frequency of the reference clock signal at 40 is a multiple of the communication frequency of the transceiver. The communication frequency is established by the intervals 22 (FIGS. 2 and 3). For example, in the preferred embodiment the transceiver 10 communicates symbols at 5 megahertz, and the reference clock signal at 40 from the oscillator 30 occurs at 40 megahertz. The oscillator 30 is preferably a crystal controlled oscillator of a high degree of accuracy (for example, ±0.01%).

In response to the reference clock signal at 40, the counter 29 generates an interval reference signal at 39 once each interval 22. The interval reference signal 39 occurs at the frequency of the transmitted and received signals, and is applied to the protocol controller 12. The counter 29 also generates binary count signals at 41. The count signals at 41 are applied to the low order input addresses of the PROM 28.

The four-bit data pattern from the latch 26 specifies one of the 16 waveforms 20 and 24 (FIGS. 2 and 3). Each of the waveforms 20 and 24 has recorded in the PROM 28 eight values which represent the maximum magnitudes of each segment 43 or time division of the waveforms 20 and 24, as illustrated in FIG. 4. The bit pattern of the digital input value concatenated with the count signal 41 from the counter 29 forms addresses in the PROM 28 for the digital value of the amplitudes of the eight separate segments 43 which define each waveform 20 or 24. The count signals at 41 sequence the PROM 28 through each of these eight values at the rate of the reference clock signal 40, causing the PROM 28 to apply eight different digital data values to the DAC 32 for each bit pattern value applied by the latch 26. The output signal from the DAC 32 is thus a step segmentized simulation of one of the waveforms 20 and 24, as is shown by the solid lines in FIG. 4. A conventional read/write random access memory (RAM) may be substituted for the PROM 28 in applications where the generated waveform needs to be varied during network operation, or in cases where the circuit component selection favors use of a RAM. If a RAM is used its contents are loaded by the network protocol controller 12.

Each of the eight digital values from the PROM 28 is rapidly converted by the DAC 32 to an analog signal. The step segmentized output signal from the DAC 32 for one waveform 20 (FIG. 2) is shown in solid lines in FIG. 4. The transmit filter 34 smoothes out the steps and creates the sine pulse waveform 20 shown by dashed lines in FIG. 4. The sine pulse represented by this waveform 20 is defined by the four bit digital input value.

To transmit an interval 22 of silence on the medium 14, the network protocol controller 12 asserts the one bit inhibit signal to the latch 26. The assertion of the inhibit signal causes the output signals from the PROM 28 to maintain that constant value which represents a zero analog signal. The DAC 32 generates a null output signal for the duration of the interval 22 during which the zero level constant value is applied from the PROM 28.

The transmit filter 34 is preferably a linear interpolation filter which has an impulse response which is a single pulse whose width is equal to the width of each segment of the waveform generated by the oscillator 30 and PROM 28. Thus, for a 200 nsec. (5 MHz) signal which is divided into eight segments, the width of the pulse impulse response from the transmit filter 34 is 25 nsecs.

The transmit amplifier 36 amplifies the signal from the transmit filter 34 and supplies it to the primary winding of the transformer 38. The transformer 38 induces the sine pulse onto the medium 14. Of course, if the medium 14 is something other than electrical cable (coaxial cable or twisted pair cable) as is illustrated, a known piece of appropriate equipment is substituted for the transformer 38 in accordance with the type of communication medium. For example a light emitting diode or semiconductor laser is typically used with an optical fiber medium. The sine pulse signals actually present on the medium have the shape of that shown in FIG. 5, although the amplitude and phase varies depending on the digital value which the signal represents.

When transmitting data, the network protocol controller 12 periodically inserts calibration pulses in the stream of transmitted symbols. One calibration pulse is shown in FIG. 5. Each calibration pulse is created from a full amplitude waveform 20 (FIG. 2) commencing with a positive half cycle and ending with a negative half cycle. Each calibration pulse is preceded and followed by an interval 22 of silence.

The calibration pulses synchronize the phase of the sampling points of the receiver means relative to the phase of the received sine pulses. The calibration pulses also establish a basis for eliminating the effects of distortion created by the preceding signal and by the LAN medium itself. The calibration pulses are further used to adjust the gain of the receiver means of the transceiver 10 to eliminate the effects of network amplification or attenuation, thereby allowing the different amplitudes of the received sine pulses to be accurately decoded into the four-bit value which each individual symbol represents. The calibration pulses are further useful in satisfying the communication protocol requirements of two or more different communication protocols which may be employed on the network, as is described in more detail in the two concurrently filed applications referenced above.

One source of distortion in signals conveyed over the LAN medium is intersymbol interference (ISI). ISI results primarily from reactive effects of the LAN media cable on the electrical signals. The ISI is represented by a residual signal present in the next following interval created by the preceding sine pulse in the preceding interval. This is illustrated with respect to the calibration pulse shown in FIG. 5, wherein a residual signal effect 42 remains in the silent interval 22 which follows the calibration pulse. Although the ISI effect 42 is illustrated in FIG. 5 in conjunction with the calibration pulse, an ISI effect occurs with all of the other sine pulses, but its magnitude varies as a fraction of the magnitude of the transmitted sine pulse. The receiver means measures the ISI effect for each calibration pulse to obtain a compensation factor for eliminating the ISI distortion due to all other received sine pulses, thereby more reliably distinguishing among the various amplitudes and phases of the received sine phases.

The remaining portion of the transceiver 10 shown in FIG. 1 forms the receiver means. In response to the received sine pulses on the medium, the transformer 38 induces a received signal at the input terminal of a receiver amplifier 44. The receiver amplifier 44 amplifies the received signal at 45, and the received signal is applied to a filter means, preferably a time-domain filter such as a matched filter 46. A time-domain filter means, such as the matched filter 46, responds to the received and amplified analog signals at 45 by producing a waveform 48 (FIG. 6) of maximum output energy in correspondence with input signals of a predetermined time-domain characteristic, while attenuating input signals of other characteristics. The matched filter 46 thus rejects signals other than those having the time-domain characteristics of communicating frequency sine pulses.

The use of time-domain filtering is important in the ability to distinguish low-level amplitude modulated sine pulses from noise on the communication medium. The magnitude of low-level sine pulses may be comparable to the magnitude of noise and other spurious signals. Time-domain filtering rejects the noise because the random time characteristics of the noise are not correlated to the impulse response characteristics of the time-domain filter means. The characteristics of the low-level sine pulses do correlate with the impulse response characteristics of the time domain filter means and those signals are passed as primary signals 48 which represent symbols. Each different symbol is distinguished by its amplitude, and the amplitude of each symbol is directly related to the amplitude of the sine pulse which represents and creates that symbol.

Output signals from the matched filter 46 include the primary signal at 48, which represents a symbol, and a derivative signal at 50, shown in FIG. 6. The derivative signal 50 is the mathematical derivative of the primary signal 48. The derivative signal is achieved as an inherent function of the matched filter 46. The primary signal waveform 48 inherently achieves its maximum value when the derivative waveform crosses through a zero value, as is illustrated by the dashed line 51 in FIG. 6. The center point in time width of the waveform 48 occurs coincidentally with the center of the interval in which a sine pulse occurs. Although the primary or symbol waveform 48 is shown in FIG. 6 on an expanded time axis relative to the calibration pulse shown in FIG. 5, the time center points of both signals are coincident as shown in FIGS. 5 and 6.

The primary signal waveform at 48 is applied to a threshold detector 52 and the derivative waveform at 50 is applied to a zero crossing detector 54, as is shown in FIG. 1. The function of the threshold detector 52 is to require the primary waveform to exceed a predetermined threshold value, illustrated by level 53 in FIG. 6, before the threshold detector supplies an output signal at 55 to an AND gate 56. The zero crossing detector 52 supplies a narrow output pulse signal 57 to the AND gate 56 at the time when the derivative waveform 50 achieves a zero value (line 51, FIG. 6).

The output signal at 55 from the threshold detector 52 and the output signal at 57 from the zero crossing detector 54 are applied to the input terminals of the AND gate 56. When both input signals to the AND gate 56 are asserted, an asynchronous signal is supplied at 60 to a clock synchronizer 62.

The asynchronous signal 60 occurs at the point when the primary signal 48 from the matched filter 46 achieves its maximum value, which is at the same point that the derivative signal 50 of the matched filter 46 achieves its zero level. This relationship is shown in FIG. 6 where the derivative signal 50 crosses through the zero level while the primary signal 48 is at its maximum level. Since it is important that the receiver means decode the received signals within an acceptable time interval or phase angle of their precise maximum value (either positive or negative), the use of the zero crossing detector 54 to monitor the derivative signal assures that the asynchronous signal 60 occurs at the time when the primary signal 48 from the matched filter 46 is at its maximum (line 51, FIG. 6). This point is asynchronously related to the reference clock signal 40, because the reference clock signals 40 of the transceivers 10 at the transmitting and receiving nodes are not the same signals.

The purpose of the asynchronous signal 60 is to cause the synchronizer 62 to supply an output sample clock signal 64 at a predetermined consistent phase angle relative to the asynchronous signal 60. As a result, the sample clock signal 64 also occurs at a predetermined fixed phase relationship with each received sine pulse and each symbol or primary waveform 48, thereby establishing a timing basis for sampling each primary waveform at its maximum amplitude. Failure to synchronize the sample clock signal 64 with the phase of the received sine pulses would result in an inability to accurately sample the maximum amplitudes of the primary waveforms, because the amplitude would be sampled at a point other than within an acceptable range of their peaks.

A resynch enable signal at 58 is supplied by the network protocol controller 12 for the purpose of enabling the clock synchronizer 62 only in response to the calibration pulses and not in response to other sine pulses which convey data. The periodicity at which calibration pulses are inserted within the network transmission frames is determined by the LAN communication protocol. The functionality of the network protocol controller 12 and the insertion of the calibration pulses have been described more completely in the two concurrently filed applications mentioned above. For example, in the preferred embodiment disclosed in these two applications, one calibration pulse (and its preceding and following silent intervals) is inserted after each 16 intervals in the data field of each transmitted frame. The network protocol controller 12 of each node recognizes the beginning of a frame by a starting delimiter code in each transmitted frame, and thereafter delivers the resynch enable signal 58 at the appropriate subsequent time intervals when the calibration pulses are expected to appear in the symbol stream of the frame. The presence of the resynch enable signal 58 causes the clock synchronizer 62 to respond to the asynchronous signal 60 only at the appropriate times.

The sample clock signal 64 from the synchronizer 62 is applied to an analog to digital converter (ADC) 66, an input latch 68, an ISI latch 70, a peak latch 72 and an output latch 74 to achieve a simultaneously clocked flow of data. The sample clock signal 64 is also supplied to the protocol controller 12 so its operation may be synchronized with the presentation of the decoded digital output values at 18.

The ADC 66 converts the analog value of the primary signal 48 from the matched filter 46 to a digital value upon the application of the sample clock signal 64. The ADC 66 may be of the "flash" converter type which rapidly converts the signal at its input terminal to an output digital value. The ADC 66 could alternatively be of the sample-and-hold type which accurately samples the analog signal level at the specific instant in time established by the sample clock signal and then converts this sampled level to a digital value at a slower rate (but no slower than the time interval 22).

The input latch 68, the ISI latch 70, the peak latch 72, and the output latch 74, all accept and latch the values applied at their input terminals upon the assertion of the sample clock signal 64. After latching the input value, that latched value is available at the output terminals of these latches.

A "pipeline" data flow through the ADC and latches is shown in FIG. 7, and is described with reference to FIG. 1 and in relation to a series of arbitrary clock signals and primary waveforms. The ADC 66 converts the maximum amplitude of a first primary waveform at 48 to a first digital value upon the application of a first sample clock 64. Upon the application of a second sample clock signal 64, the ADC 66 converts the maximum amplitude of a second primary waveform to a second digital value, while the first digital value is latched into the input latch 68 by the effect of the second sample signal. For a data symbol, the value in the input latch 68 is shifted to the output latch 74 by the third sequential sample clock signal 64. For a calibration pulse, the peak analog value of the calibration primary waveform is latched in the peak latch 72 by the third sequential sample clock signal and is held in the peak latch 72 until the receipt of the next calibration pulse (which is 19 intervals later in the preferred embodiment described in the two concurrently filed applications). The value of the ISI which occurs in the interval immediately following the calibration pulse is decoded and latched in the ISI latch 70 by the fourth sequential sample clock signal. The ISI value is held in the latch 70 until the ISI value associated with the next calibration pulse is obtained. The sample clock signal 64 is applied to these latches in order to clock their operation in synchronism with the other operations occurring in the receiver means.

The value from the input latch 68 would ideally represent the amplitude of the original transmitted sine pulse, except for the variable and dynamically changing effects of distortion, attenuation and gain created by the LAN medium. The receiver means of the transceiver 10 includes means for adjusting the raw value from the input latch 68 to compensate for these effects.

The ISI effect is the residual signal 42, shown in FIG. 5, which extends into the following interval 22 from that preceding interval where the sine pulse was transmitted. The residual signal 42 has the practical effect of influencing the amplitude of any symbol in the following interval. The ISI effect 42 adds in an algebraic sense to the subsequent signal, regardless of whether the subsequent signal is positive or negative or the residual effect is positive or negative. The ISI effect occurs throughout every interval, except those which are preceded by silence. Since each symbol has the potential of being influenced by an ISI effect, the ISI effect must be taken into consideration in order to derive a value which is representative of the true amplitude of the symbol transmitted, as if the ISI effect was not present.

The receiver means of the transceiver 10 includes means for compensating for the ISI effect, and means for adjusting the gain of the receiver or normalizing the received signal to compensate for attenuation or gain. The preferred example of such means is achieved by the functionality associated with the ISI latch 70, the peak latch 72, the output latch 74, a threshold circuit 75, a multiplier 76, a subtracter 78, and a divider 80.

Due to the pipeline effect, a calibration pulse value will be held in the input latch 68 when the value of the ISI is converted by the ADC 66. On the next subsequent sample clock signal 64, the network protocol controller delivers an enabling signal at 81 to the peak latch 72. The sample clock signal 64 is also applied to the peak latch 72. The simultaneous assertion of both signals 64 and 81 causes the peak value of the calibration pulse primary waveform held in the input latch 68 to be latched into the peak latch 72. The signal at 81 is timed relative to the resynch enable signal 58 to occur at the appropriate time in the "pipeline" to cause the calibration pulse value to be latched in the peak latch 72. The signal at 81 is thereafter negated to assure that the value of the calibration pulse is maintained in the peak latch 72 until the next calibration pulse value is available to be latched in the peak latch 72. Simultaneously with loading the peak latch 72, the ISI value is transferred from the ADC 66 into the input latch 68, as a result of the same sample clock signal 64.

With the next sample clock signal 64, the ISI value is transferred from the input latch 68 into the ISI latch 70 as a result of the simultaneous assertion of an enabling signal 82 applied from the network protocol controller 12 and the sample clock signal 64. The enabling signal 82 is also timed relative to the resynch enable signal 58 so it occurs at the appropriate time in the "pipeline" to record the ISI value in the ISI latch 70. The ISI value remains recorded in the ISI latch 70 until the next ISI value associated with the next calibration symbol is available. The value recorded in the ISI latch 70 is representative of the pure or uninfluenced ISI created by the calibration pulse, because the ISI effect 42 occurs during an interval 22 of silence which follows each calibration pulse.

While the ISI value is recorded in the ISI latch 70, the value of the next following data symbol is recorded in the input latch 68 after having been derived by the ADC 66 in the preceding interval. Thus, at the time that the ISI value is available from the ISI latch 72, the value of the first data symbol following the calibration pulse is available from the input latch 68 and the peak value is available from the peak latch 72. The compensated value from the silent interval proceeding the calibration pulse is available from the output latch 74. The mathematical operations associated with removing the ISI effect and with achieving the normalization are described below, commencing with this starting reference.

The ISI value from the ISI latch 70 is presented to one input terminal of the multiplier 76, and the value from the output latch 74 at 18 is presented to the other input terminal of the multiplier 76. The multiplier 76 has the effect of immediately multiplying the ISI value from the ISI latch 70 by the value available at 18 from the output latch 74. At this point in the pipeline, the value latched in the output latch 74 will be the value of any ISI which occurred during the silent interval which preceded the calibration pulse, which should be a low or zero value because the ISI should have been eliminated by the operations now being described. The product output value from the multiplier 76 under the circumstances will be very small or non-existent, and it will be derived almost simultaneously with the application of the values to the input terminals of the multiplier.

The product value from the multiplier 76 is applied to one input terminal of the subtractor 78. The other input value to the subtracter 78 is the raw or uncompensated primary waveform data symbol value from the input latch 68. The subtracter 78 subtracts the value supplied by the multiplier 76 from the value supplied by the input latch 68. The result of the subtraction is a value which is free of the ISI effect.

To achieve normalization, the divider 80 divides the value from the subtracter 78 by the peak value of the calibration pulse stored in the peak latch 72. The division by the divider 80 has the effect of normalizing the effects of attenuation and amplification by the network medium and thus achieves a form of automatic gain control which compensates for the gain and attenuation factors. The result of the division is supplied to a threshold circuit 75.

The threshold circuit re-encodes the normalized value from the divider 80 into a data value equivalent to one of the digital input values originating at transmitting node. The function of the threshold circuit 75 is required because the ISI and attenuation/amplification effects are typically fractional, so the ADC 66 must produce more bits of digital information than the original digital input data value. In the preferred embodiment the data path through the ADC 66, input latch 68, ISI latch 70, peak latch 72, multiplier 76, subtacter 78, and divider 80 is 8 bits wide. The threshold circuit 75 is a PROM look-up table which regenerates the 4-bit digital output data value from the 8 bit wide value applied at its input, by the operations described in conjunction with equation (2) below.

In actual practice. both the function of the multiplier 76 (8 bits from the ISI latch 70 times 4 bits from the output latch 74 and the function of the divider 80 (8 bits by 8 bits) are typically implemented by PROM tables rather than by combinatorial logic. If a PROM is used for the divider 80, the functionality of the divider 80 and the threshold circuit 75 can be precalculated and combined into a single PROM look-up table. On the next sample clock signal 64, the signal from the threshold circuit 75 is latched in the output latch 74, and this signal becomes the digital output value at the output data path 18.

This same effect occurs with the second data symbol in the "pipeline". A difference occurs, however, because the value at 18 which is applied to the multiplier 76 is no longer low or non-existent. Instead, the multiplier calculates a value which represents the amount of ISI created by the previous data symbol. This ISI value is subtracted from the next raw symbol value by the subtracter, and the result is normalized in the manner described by the divider 80 and threshold circuit 75.

Eliminating the ISI effect and normalizing the result to achieve automatic gain control occurs with each symbol which is received, and the fractional result of the normalization is relegated into the appropriate four-bit digital output value. This procedure continues in the sequential "pipelined" manner described as a result of sequentially shifting the values from the latches and performing the mathematical operations described, upon the application of the sample clock signals 64.

The following equation (1) mathematically summarizes the ISI elimination and normalization functionality:

$$DVO = \frac{CV - (DVP \times ISI)}{P} \qquad (1)$$

In equation (1), DVO represents the value output from the divider 80; CV represents the current or raw digital value, stored in the input latch 68; DVP represents the thresholded previous digital value of the immediately previous symbol present at 18; ISI represents the value stored in the ISI latch 70; and P represents the peak value stored in the peak latch 72.

In summary, the effects of distortion are eliminated first by detecting the magnitude of the ISI factor at each particular transceiver. This is determined, as previously noted, by sampling the ISI value associated with a full amplitude calibration pulse. The ISI value is multiplied by the preceding symbol value and that result is subtracted from the current value. The result of the subtraction represents a value which is uninfluenced by ISI. The amount of the uninfluenced value is thereafter normalized by dividing its value by the peak value of the calibration symbol. The normalization has the effect of eliminating the influences of network medium attenuation and amplification. The thresholding function of the threshold circuit 75 classifies the corrected data value into the appropriate digital output value.

For signaling techniques which use N amplitude levels of each phase of the waveforms 20 or 24 (8 levels are used in each phase in the preferred embodiment), the threshold circuit 75 groups these waveforms by $N-0.5$ equal intervals (7.5 in the preferred embodiment). The half-sized interval occurs at the upper end of the amplitude range because the other $N-1$ intervals are centered about the nominal value for the amplitude of that particular primary waveform. The largest value primary waveform has its nominal value at the maximum amplitude, so only the half-interval below this maximum amplitude is part of the acceptable classification range for this maximum value.

The function of the threshold circuit 75 is represented by the equation (2):

$$TDV = INT(DVO \div (NST \div (N - 0.5))) \qquad (2)$$

In equation (2), TDV represents the threshold data value supplied by the threshold circuit 75; DVO represents the divider output value from the divider 80; NST is the number of discrete states possible in DVO for one phase of the received signal, ($2^7$ for 7 bits in the preferred embodiment); N is the number of discrete amplitude levels used for digital encoding (16 for the preferred embodiment ; and INT is a function which returns the integral part of its argument while discarding the fractional part of the argument.

The functionality of the threshold circuit 75, the multiplier 76, and the divider 80 are preferably implemented by PROMs wherein the two input values represent an address and the output value is pre-recorded at the address of the two input values and represents the mathematical operation of the two input values. With this implementation the divider 80 and threshold function 75 may be merged into a single PROM. The subtracter 78 is implemented with binary full adders.

FIG. 8 shows the matched filter 46 used in the preferred embodiment. The inductive and capacitive components enclosed in the dashed box 84 achieve the actual time-domain filtering function. A primary output filter signal from the filtering components 84 is the voltage signal at 48A, which is converted to the primary waveform signal 48 by a transistor 85 and its associated load circuit. A derivative output filter signal from the filtering components 84 is the current signal at 50A, which is converted to a voltage derivative waveform signal 50 by the transistor 86 and its associated load circuit.

In the preferred embodiment of the present invention, the components of the matched filter 46 have the following values: inductors L—8.2uH; capacitors C1—22pF, C2—56pF, C3—82pF, and C4-0.1uF; and resistors R1—1.1 KOhms, R2—10 Ohms, R3—100 Ohms, R4—510 Ohms, and R5—750 Ohms. The transistors 85 and 86 are part number 2N3906.

The threshold detector 52 and the zero crossing detector 54 are preferably implemented by conventional comparators.

The details regarding the clock synchronizer 62 are described in conjunction with FIG. 9. The requirements of the clock synchronizer 62 are that it must be able to generate the sampling clock signal 64 with sufficient phase accuracy, relative to the asynchronous signal 60, that the amplitude of the primary waveform signals are sampled for conversion into digital values within an acceptable time interval of their peaks. The frequency of the sampling clock signal 64 must be sufficiently accurate, relative to the nominal transmission frequency, that the sampling point will remain within acceptable tolerance for the number of symbols transmitted between calibration pulses. For example, 18 symbols occur between the calibration pulses in the preferred embodiment discussed in the first two mentioned concurrently filed applications.

The necessary phase accuracy level can be determined based on the number of amplitude levels which need to be recognized and the attenuation of the medium 14. The relationship is given by equation (3):

$$\frac{(\sin 2\pi t)}{2\pi} - (t\cos\pi t) = 1 - \frac{1}{(db \cdot N_a \cdot 2)} \quad (3)$$

where:

t is the sample point at which the maximum allowed sampling error will occur. (1−t) Tp is the allowed sampling error (where Tp is the sampling clock period).

db is the attenuation of the medium in decibels.

$N_a$ is the number of symbol amplitudes minus 1.

For maximum efficiency the clock synchronizer 62 should be able to generate the appropriate sampling clock signal 64 based on the asynchronous signal 60 from a single calibration pulse at the beginning of each transmission, since a requirement for multiple calibration pulses increases the length, hence the transmission time, of all network frames without increasing the amount of data communicated. The ability to accurately synchronize from one calibration pulse requires that the first cycle of the sample clock signal 64 be available in much less than one symbol period after the zero crossing of the derivative signal occurring as a result of the first calibration pulse.

The synchronizer 62 shown in FIG. 9 receives three input signals: the reference clock signal 40 (FIG. 10A) from the precision oscillator 30 (FIG. 1); the asynchronous signal 60 (FIG. 10I) from the AND gate 56 (FIG. 1), the leading edge of which indicates the point in time for synchronization to occur; and the resynch enable signal 58 (FIG. 10G) supplied by the network protocol controller 12 (FIG. 1). The resynch enable signal 58 must be asserted for a transition of the asynchronous signal 60 to cause resynchronization. The output signal from the clock synchronizer 62 is the sample clock signal 64. The sample clock signal 64 is essentially a division by 8 of a selected phase shifted reference clock signal 40 which is phase shifted by an amount necessary to achieve a substantially in-phase relationship between the asynchronous signal 60 and each cycle of the selected phase shifted version of the reference clock signal. The start of the sample clock signal 64 after a blanking period, described below, causes the first transition of the sample clock signal 64 almost immediately after the occurrence of the asynchronous signal 60, thereby causing the ADC 66 to sample the peak of the initial calibration pulse in the frame.

The synchronizer 62 includes a multi-tap, delay line 90 with a total time delay no less than the period of the reference clock signal 40 and providing an odd number of taps for use (5 are illustrated); a pair of edge-triggered, D-type flip-flops 92 and 94; an edge triggered register 96 with at least as many inputs as there are taps utilized on the delay line 90; a phase selection logic circuit 98 which selects the required phase for the sample clock signal 64 based on the content value of the register 96; a multiplexer 100 which passes the selected one of the signals available from the taps of the delay line 90 and inversions of those signals, under control of the phase selection logic circuit 98; a gate 102 to inhibit or "blank" the sample clock signal 64 while resynchronization is taking place; a digital delay line 104 which determines a fixed delay through the clock synchronizer 62; a counter 140 to generate the sample clock signal 64 from the selected one of the phase shifted and inverted signals available from the multiplexer 100; and a number of logic gates 142, 144 and 146 which logically control the level of various signals 148, 150 and 152 in the synchronizer 62.

The delay line 90 controls important aspects of the synchronizer's functionality. By conducting the reference clock signal 40 through the multi-tap delay line 90, a series of phase-shifted copies or versions of the reference clock signal are available at the various taps. These phase shifted versions of the signal 40 are collectively referenced 106 in FIG. 9 and are individually referenced 106A, 106B, 106C, 106D and 106E in FIGS. 10B, 10C, 10D, 10E and 10F, respectively. There are a wide variety of means to implement the function of the delay line 90, some of which are discussed below.

The delay line 90 must provide a total delay at least as long as the period of the reference clock signal 40 (if longer, only the first "Nt" taps of the delay are used). An odd number of taps spread approximately evenly in time delay increments over the period of the reference clock signal 40 must be available. A minimum inter-tap delay spacing must exist which is greater than or equal to the setup time of the flip-flops in the register 96. Approximately uniform delays applied to both the rising and falling edges of the reference clock signal 40 must occur at each tap. Delay lines with these characteristics are readily available as printed circuit board mountable hybrid circuit modules from a number of manufacturers, such as Bel Fuse, Inc., Jersey City, N.J. (digital delay line series 0447), and Data Delay Devices Inc., Clifton, N.J. (active delay line DDU-xF series). For integrated circuit applications silicon delay lines can be fabricated, or strings of gates with predetermined minimum and maximum propagation delays can be used.

The resynch enable signal 58 (FIG. 10G) which enables resynchronization is supplied to the flip-flop 94. On the falling edge of an internal synchronized clock signal at 148 (FIG. 10R), the flip-flop 94 sets (arrow 107, FIGS. 10H and 10R) and supplies an output signal 108 (FIG. 10H). An internal synchronized clock signal 148 (FIG. 10R) is held in the low state (arrow 109, FIGS. 10H and 10R) due to the application of signal 110 from the flip-flop 94 to the AND gate 102 until resynchronization occurs. Setting flip-flop 94 negates an overriding reset created by signal 108 normally supplied to flip-flop 92. In systems where the network protocol controller 12 can supply the reynch enable signal 58 in proper phase relationship with the sample clock signal 64, flip-flop 94 may be clocked by the resynch enable signal 58 (with its D-input tied high), thereby eliminating the need to feed signal 148 back to the clock terminal of flip-flop 94.

The rising edge of the asynchronous signal 60 (FIG. 10I) sets flip-flop 92 after negation of the overriding reset (signal 108) to thereby initiate clock resynchronization (shown by an event line 111, FIGS. 10A to 10R). Flip-flop 92 supplies an output signal 112 (FIG. 10J), which transitions from low to high immediately after the rising edge of the asynchronous signal 60. Flip-flop 92 will not go into a metastable condition due to a setup time violation, because its D-input is connected to a high logic level signal 114.

When flip-flop 92 sets at the beginning of a resynchronization event (111, FIGS. 10A to 10R), the rising edge of its output signal 112 clocks the register 96, causing the value represented by the current state or logic levels of the phase shifted clock signals 106 to be stored into the register 96. The current state of the phase shifted clock signals 106A to 106E are shown in FIGS. 10B to 10F at the intersection of the event reference line 111. The output signals available from the register 96 at the event line 111 are illustrated at 116A to 116E in FIGS. 10K to 10O, respectively. The states of the output signals 116A to 116E define sampled phase information signals and are collectively referenced in FIG. 9 as 116.

The particular situation illustrated in FIGS. 10C and 10L is a case where the resynchronization event 111 created by the asynchronous signal 60 is very close in time to the transition of the phase shifted clock signal 106B, thereby causing a setup time violation 113 (FIG. 10C) at one flip-flop of the register 96. The setup time violation induces a metastable condition 115 in the output signal 116B from this flip-flop of the register (FIG. 10L). As soon as the metastable condition settles, the output signal levels 116A to 116E from the register correspond to the levels of the signals 106A to 106E at the resynchronization event 111. Signal 116B may settle in its previous state, which is acceptable since that state is indicative of a phase one earlier in the sequence and event 111 is within the phase error tolerance of that phase.

With an odd number of taps of the delay line 90 spaced over the period of the reference clock signal 40, at most one of the clock phases is in transition at any instant in time. If an even number of delay line taps were spaced over the period of the reference clock signal 40, there would be instants where two clock phases were in transition at the same time, i.e. one phase rising while the other phase falling. If two phases could be changing at the same time, there would be the possibility of two flip-flops in the sampling register 96 (FIG. 9) going metastable at the same time, making the synchronizer 62 lower in phase accuracy.

The phase information 116 from the register 96 (after metastable condition settling) is encoded by the phase selection logic circuit 98 to generate selection control signals 118. The selection control signals 118 control the multiplexer 100 to select a single one of the phase-shifted clock signals 106, or an inverted version of one of these signals, and supply the selected signal at 106S. The multiplexer 100 inverts the five phase shifted clock signals 106 (106A to 106E, FIG. 10B to 10F) to create five additional available signals, any one of the ten (5 normal and 5 inverted) of which becomes the signal 106S. The signal at 106S becomes the internal synchronized clock signal 148 after passing through the gate 102.

When a metastable condition 115 (FIG. 10L) occurs, the asserted output signal 106S from the multiplexer 100 can undergo a somewhat prolonged settling time 124 (FIG. 10P), which is prevented from affecting the internal synchronized clock signal 148 during a blanking period 126 (FIG. 10Q) imposed by the delay line 104. The blanking delay period 126 must be at least as long as the metastable settling time of the flip-flops in register 96 plus the propagation delays through the phase selection logic 98 and the multiplexer 100. The length of delay imposed by the delay line 104 is normally calculated to end during a low half-cycle of the multiplexer output signal 106S.

The delay line 104 creates a fixed time delay or blanking period 126 (FIG. 10Q) between the setting of flip-flop 92 and the clearing of flip-flop 94. When flip-flop 92 sets in response to the asynchronous signal 60, a signal 120 is supplied to the fixed delay line 104. Upon expiration of the predetermined delay time established by the fixed delay line 104, a signal 122 is supplied to reset or clear the flip-flop 94 (arrow 127, FIGS. 10Q and 10H). After being cleared, the flip-flop 94 resets flip-flop 92 with the assertion of signal 108 (arrow 128, FIGS. 10H and 10J), to prepare flip-flop 92 for the next resynchronization event. Resetting flip-flop 94 ends the blanking interval 126, permitting the AND gate 102 to gate the signal 106S from the multiplexer 100 as the internal synchronized clock signal 148 (arrow 141, FIGS. 10Q and 10R). The clock synchronizer is now synchronized in phase to the received calibration pulse, as established by the asynchronous signal 60.

The sample clock signal 64 is generated from the internal synchronized clock signal 148 by the counter 140 and gates 142, 144 and 146. The basic function of the counter 140 is to serve as a frequency divider, dividing by 8 in the case of the preferred embodiment. By dividing the cycles of the signal 148 by the same value as the counter 29 uses to establish the signal 39 (FIG. 1), each cycle of the sample clock signal 64 occurs in synchronism and in a predetermined phase relationship with each interval 22 of received sine pulses and primary waveforms. The count sequence of the counter 140 is more complex than that of a simple modulo-8 frequency divider due to the fact that the initial cycle of the sample clock signal 64 following resynchronization is shorter than those of subsequent cycles due to the blanking interval (126, FIG. 10Q) of the synchronizer.

Operation of the counter 140 is described as follows. Upon assertion of the resynch enable signal 58, flip-flop 94 sets, negating signal 110 and thereby halting the internal synchronized clock signal 148 supplied by NAND gate 102 from the signal 106S. The setting of flip-flop 94 also causes the counter 140 to be asynchronously cleared by the assertion (active low) of a counter reset signal 150 from the NAND gate 142. The counter reset signal 150 remains asserted until the occurrence of the asynchronous signal 60, which sets flip-flop 92 and changes the state of signal 120. Signal 120 is negated, as is signal 150 by action of the NAND gate 142.

The occurrence of the asynchronous signal 60 coincides with the peak amplitude of the calibration pulse, which must be sampled by the analog-to-digital converter 66 for storage in the peak latch 72 (FIG. 1). Accordingly, a transition of the sample clock signal 64 is required immediately following the occurrence of the asynchronous signal 60 during a resynchronization event. The initial transition of the sample clock signal 64 occurs immediately due to the setting of flip-flop 92, which asserts signal 112, thereby resulting in the assertion of signal 152 through an AND gate 144. The other input signal 145 to the gate 144 comes from an intermediate tap on delay line 104. The exact delay of this intermediate tap signal 145 is not critical, so long as it is shorter than the delay of signal 122. The purpose of this intermediate delay signal 145 is to force the negation of signal 152 prior to the end of the blanking interval which occurs due to the negation of signal 122. The assertion of signal 152 causes a single clock pulse to be supplied to the counter 140 through an OR gate 146.

The presence of the single gate 142 in the combinatorial path between flip-flop 92 and counter 140, the reset input terminal of and the presence of two gates 144 and 146 in the combinatorial path between flip-flop 92 and the clock input terminal of counter 140 ensures that the reset signal 150 will be negated before the initial assertion of the sample clock signal.

The count sequence of counter 140 is shown below, with output Q2 used as the sample clock signal 64.

| Q3 | Q2 | Q1 | Q0 | |
|----|----|----|----|---|
| 0 | 0 | 0 | 0 | reset state |
| 0 | 1 | 0 | 0 | clocked due to signal 152 |
| 0 | 1 | 0 | 1 | clocked due to signal 106S |
| 0 | 1 | 1 | 0 | . |
| 1 | 0 | 0 | 0 | . |
| 1 | 0 | 0 | 1 | . |
| 1 | 0 | 1 | 0 | . |
| 1 | 0 | 1 | 1 | |
| 1 | 1 | 0 | 0 | |
| 1 | 1 | 0 | 1 | |
| 1 | 1 | 1 | 0 | |
| 1 | 1 | 1 | 1 | |

The sequence between the two horizontal lines repeats until the next reset event occurs. A count sequence of this type can easily be generated by a programmable array logic (PAL) device such as a PAL22V10, made by Advanced Micro Devices, or by a PAL16L8D along with a four-bit register such as a 74F175. The duration of the high period of the initial cycle of the sample clock signal 64 is the same as that of subsequent pulses, despite the fact that only three counter states have Q3 high in the initial count sequence due to the blanking interval (126, FIG. 10Q) between state 0100 and state 0101.

In practice, the gates 142, 144 and 146 are typically gating functions which can be economically implemented by a programmable array logic (PAL) structure. For example, a single PAL16L8D integrated circuit from Advanced Micro Devices, plus a single 74F00 dual-input or 74F10 triple-input NAND gate for the output stage of the multiplexer 100 have proved satisfactory.

One requirement of the delay line 104 is that the minimum time delay between the assertion of the asynchronous signal 60 (when resynchronization is enabled) and the occurrence of the internal synchronized clock signal 148, should be a fixed value of predetermined duration. The amount of this time delay is determined as follows. When the number of taps ("Nt") of the multi-tap delay line 90 is just sufficient to provide the desired phase accuracy (as defined in the next following paragraph), the minimum delay time of delay line 104 must be at least the metastable settling time of the flip-flops in register 96 plus the propagation delay through the phase selection logic circuit 98 and the multiplexer 100. When the desired phase accuracy can be achieved by not ore than ((Nt/2)−0.5) taps of the multi-tap delay line 90, the minimum delay time of delay line 104 can be reduced to equal the propagation delays through the phase selection logic circuit 98 plus the multiplexer 100. Normally, extended delays will be in increments equal to the period of reference clock signal 40, but arbitrary extensions are possible. An arbitrary extension is especially useful in cases where the initial cycle of the sample clock signal 64 must have a predefined amount of asymmetry, but where a square wave is needed on all subsequent cycles.

Because the output signal 112 from the flip-flop 92 begins upon detection of a transition of the asynchronous signal 60, and does not involve the reference clock signal 40, the delay through the synchronizer 62 is dependent upon either component delays or the duration of the delay line 104. Unlike a conventional, dual-rank flip-flop synchronizer, the synchronizer 62 has no variation in propagation delay related to the phase relationship between the reference clock signal 40 and the asynchronous signal 60.

The achievable phase accuracy of the internal synchronized clock signal 148, relative to the asynchronous signal 60, is equal to one-half of longest inter-tap delay on the delay line 90. In the typical case, where the taps on the delay line 90 are equally spaced in delay duration, the maximum phase error is given by equation (4):

$$Tpe = 0.5 \, (Trc/Nt) \tag{4}$$

Where
Tpe is the maximum phase error (in ns),
Trc is the reference clock period in ns), and
Nt is the number of taps used on the delay line 90.

By appropriate adjustment of the phase shifted clock versions 106 to the multiplexer 100, the symmetry of this phase error can be adjusted. The typical case, as in the circuit shown herein, is an error of zero to +one-half of the inter-tap delay.

The clock synchronizer 62 is also in a condition to be resynchronized upon the next calibration pulse, by the application of a resynch enable signal 58 and an asynchronous signal 60. Upon the next assertion of the resync enable signal 58, the synchronizer 62 stops generating the sample clock signal 64 until it is again resynchronized in the manner described, and then commences supplying the sample clock signal 64.

Details of the phase selection logic circuit 98 and multiplexer 100 are shown in FIG. 11, for an embodiment of the synchronizer which synchronizes to an accuracy of one-tenth of the sample clock period using a 5-tap delay line 90. The 5 bits of phase information 116 are shown as signals 116A, 116B, 116C, 116D and 116E. The ten meaningful combinations of this phase information (normal and inverted assertions) are decoded by the 10 5-input AND gates 132. The states decoded by these AND gates 132 are mutually exclusive, so no more than one of the 10 selection control signals 118 may be asserted at any time. Due to the repetitive nature of the reference clock signal 40 and the phase shifted clock versions 106 which are sampled in the register 96, the 10 states decoded by the phase selection logic circuit 98 are the only valid states. Accordingly, once the possible metastable condition 115 (FIG. 10L) in one flip-flop of register 96 FIG. 9) has settled, only one of the selection control signals 118 will be asserted. The asserted one of the selection control signals 118 specifies which one of the phase shifted clock signals 106, or inversions thereof, will be supplied as the internal synchronized clock signal 148 within the maximum allowable range of phase error.

The logic equation provided by the gating arrangement shown in FIG. 11 exclusively selects the phase shifted clock signal 106, or an inversion thereof, based on the maximum acceptable phase error (0 to +½ the inter-tap delay, in this example) based on a diagrammatic analysis of the normal and inverted phase shifted clock signals and the relative occurrence of the asynchronous signal. Other gating arrangements could be utilized for selections of different acceptable ranges of phase error or phase displacement.

The five phase clock signals 106 from the delay line 90 are brought into the multiplexer 100 as signals 106A, 106B, 106C, 106D and 106E. The single asserted selection control signal 118 selects the appropriate clock phase signal or an inversion thereof by enabling only one of 10 2-input AND gates 134 and 136. The five AND gates 134 pass their input phase shifted clock signal unmodified in phase, and the other 5 of these AND gates 136 invert their input phase shifted clock signal. This permits 10 discrete clock phases to be generated using only 5 phase-shifted reference clock verions 106. The selected clock output signal 106S from the multiplexer 100 is generated by combining the outputs of the 10 AND gates 134 and 136 in a 10-input OR gate 138.

The phase selection truth table represented by the components shown in FIG. 11 is set forth below:

| Signal | 116A | 116B | 116C | 116D | 116E | Selected Signal |
|---|---|---|---|---|---|---|
|  | 0 | 0 | 1 | 1 | 1 | 106E |
|  | 0 | 0 | 0 | 1 | 1 | inverted 106C |
|  | 1 | 0 | 0 | 1 | 1 | 106A |
|  | 1 | 0 | 0 | 0 | 1 | inverted 106D |
|  | 1 | 1 | 0 | 0 | 1 | 106B |
|  | 1 | 1 | 0 | 0 | 0 | inverted 106E |
|  | 1 | 1 | 1 | 0 | 0 | 106C |
|  | 0 | 1 | 1 | 0 | 0 | inverted 106A |
|  | 0 | 1 | 1 | 1 | 0 | 106D |

-continued

| Signal | 116A | 116B | 116C | 116D | 116E | Selected Signal |
|---|---|---|---|---|---|---|
|  | 0 | 0 | 1 | 1 | 0 | inverted 106B |

It is possible to extend this type of phase selection arbitrarily, with each additional pair of taps on the delay line 90 providing 4 additional phases. The choice of 5 taps is convenient in terms of commercially available delay lines and providing phase accuracy to one-tenth of the period of the reference clock signal 40. In the specific case of implementation of the transceiver, the reference clock signal 40 has a period of 25 ns (40 MHz oscillator 30, FIG. 1), the inter-tap delay of delay line 90 is 5 ns, the internal synchronized clock signal 138 is accurate to 2.5 ns relative to the rising edge of the asynchronous signal 60, and the metastable settling time of the synchronizer 62 is under 20 ns, so the delay provided by the delay line 104 is 45 ns (20 ns settling plus one cycle of the reference clock).

The phase-shifted clock 116E is equivalent to the reference clock signal 40 (FIGS. 10A and 10F). In theory, the synchronizer 62 will function equivalently using the reference clock signal 40 and phases 106A to 106D, or using phases 106 as the five inputs to the register 96 and multiplexer 98. In actual practice, however, the delays between the taps of the delay line can be controlled more accurately than the delay between the input to a delay line and the first tap on that delay line. Therefore, in cases where sufficient taps are available on the delay line, a tap which provides a copy of the reference clock signal (such as signal 106E in this example) is preferable to direct use of the reference clock signal 40.

The improvements available from the transceiver 10 of the present invention are significant and have been described above. The presently preferred embodiment of the transceiver has also been described in detail. It should be understood, however, that this description has been made by way of preferred example, and that the scope of the invention is defined by the appended claims.

What is claimed is:

1. A transceiver for communicating multiple bits per signal element between a plurality of nodes interconnected by a communication medium of a LAN, comprising:

transmitter means receptive of a multiple bit digital input value originating at the node, and operative for converting the digital input value into an analog signal having an amplitude and a phase which is defined by a predetermined correlation code to the bit pattern of the digital input value, said transmitter means further transmitting the analog signal over the medium to other nodes of the LAN; and receiver means responsive to each received analog signal transmitted by another node over the medium, and operative for converting the amplitude and phase of the received analog signal into a multiple bit digital output value which has a bit pattern that corresponds to the bit pattern of the digital input value, said receiver means using the predetermined correlation code to make the conversion, said receiver means further comprising:

means receptive of the received analog signal and operative for supplying a primary signal having an amplitude related in a predetermined manner to the amplitude of the received analog signal;

means responsive to the characteristics of the primary signal for generating a sample clock signal which defines the point at which the amplitude of the primary signal is to be converted to the digital output value; and means responsive to the sample clock signal for converting the amplitude of the primary signal to the digital output value.

2. A transceiver as defined in claim 1 wherein said sample clock signal generating means further comprises:

means for creating a derivative waveform corresponding to the mathematical derivative of the waveform of the primary signal;

zero detection means responsive to the derivative waveform for supplying a zero crossing signal whenever the derivative waveform is approximately zero; and means responsive to the zero crossing signal for establishing the sample clock signal.

3. A transceiver as defined in claim 2 wherein said means receptive of the received analog signal further comprises:

time-domain filter means receptive of the received analog signal and operative for supplying a primary signal having an amplitude related in a predetermined manner to the amplitude of the received analog signal.

4. A transceiver as defined in claim 3 wherein:

the transmitter means transmits each analog signal as a pulse analog signal having predetermined time-domain characteristics; and the time-domain filter means produces a maximum output energy in correspondence to a received pulse analog signal having the predetermined time-domain characteristics and substantially attenuates signals from the medium of other characteristics.

5. A transceiver as defined in claim 2 wherein the primary signals on the communication medium are each substantially in the form of a sine pulse waveform.

6. A transceiver as defined in claim 2 wherein said sample clock signal generating means further comprises:

threshold detector means responsive to the amplitude of the primary signal and operative for supplying a threshold signal whenever the amplitude of the primary signal exceeds a predetermined threshold value;

means for supplying an asynchronous signal upon the simultaneous occurrence of the zero crossing and threshold signals; and synchronizing means for establishing the sample clock signal in response to the asynchronous signal.

7. A transceiver as defined in claim 6 wherein said transmitter means transmits the analog signals over the medium at a predetermined transmit frequency, and wherein:

said synchronizer means supplies the sample clock signal at a frequency which substantially corresponds to the transmit frequency and in a predetermined fixed phase relationship with the primary signals.

8. A transceiver as defined in claim 7 wherein said synchronizer means establishes the fixed phase relationship in response to a single calibration signal.

9. A transceiver as defined in claim 7 wherein the one analog signal which establishes the sample clock signal comprises:

a calibration signal which is periodically inserted in a serial stream of analog signals transmitted by the transmitter means; and each calibration signal is of a predetermined amplitude and a predetermined phase.

10. A transceiver as defined in claim 9 wherein each calibration signal is immediately preceded and immediately followed by an interval of silence wherein no analog signal is transmitted, and said receiver means further comprises:

means responsive to the calibration signal for determining the amount of residual signal remaining on the medium during the immediately following interval of silence, the residual signal being an intersymbol interference (ISI) effect created by and related by a predetermined fraction to the preceding calibration signal; and means for eliminating the ISI effect during the conversion of each analog signal into the corresponding digital output value of the analog signal.

11. A transceiver as defined in claim 10 wherein:

the ISI effect is a fractional value established by amplitude of the residual signal in the interval following the calibration signal relative to the amplitude of the calibration signal; and said ISI effect elimination means multiplies the ISI fractional value and a value representative of the preceding converted analog signal to establish the amount of ISI effect on a currently received analog signal.

12. A transceiver as defined in claim 11 wherein:

said ISI elimination means further subtracts the amount of the ISI effect from a value representative of a current received analog signal to supply an ISI compensated value.

13. A transceiver as defined in claim 12 wherein said receiver means further comprises:

means for adjusting the gain of the receiver means to compensate for the effects of signal attenuation or signal amplification by the communication medium.

14. A transceiver as defined in claim 13 wherein said gain adjusting means comprises:

means for supplying a normalized value representative of the ISI compensated value relative to a value representative of the full amplitude of the calibration signal, the normalized value establishing the digital output value.

15. A transceiver as defined in claim 14 wherein:

said means for supplying a normalized value operatively divides the ISI compensated value by a value representative of the amplitude of the calibration signal.

16. A transceiver as defined in claim 15 wherein said receiver means further comprises:

thresholding means receptive of the normalized value and operative for classifying any fractional normalized value into the digital output value.

17. A transceiver as defined in claim 16 wherein the analog signals and the calibration signal on the communication medium are substantially in the form of a sine pulse waveform.

18. A transceiver for communicating multiple bits per signal element between a plurality of nodes interconnected by a communication medium of a LAN, comprising:

transmitter means receptive of a multiple bit digital input value originating at the node, and operative for converting the digital input value into an analog signal having an amplitude and a phase which is defined by a predetermined correlation code to the bit pattern of the digital input value, said transmitter means further transmitting the analog signal over the medium to other nodes of the LAN; and receiver means responsive to each received analog signal transmitted by another node over the medium, and operative for converting the amplitude and phase of the received analog signal into a multiple bit digital output value which has a bit pattern that corresponds to the bit pattern of the digital input value, said receiver means using the predetermined correlation code to make the conversion, said receiver means further comprising:

means receptive of the received analog signal and operative for creating a derivative waveform corresponding to the mathematical derivative of the waveform of the analog signal;

means for supplying a derivative waveform which is a mathematical derivative of the primary signal;

means for converting the amplitude of the analog signal into a digital value; and means responsive to the derivative waveform for establishing the point at which the converting means converts the amplitude of the analog signal into the digital value.

19. A transceiver as defined in claim 18 wherein the analog signals on the communication medium are each substantially in the form of a sine pulse waveform.

20. A transceiver as defined in claim 18 where said receiver means further comprises:

means receptive of the received analog signal and operative for supplying a primary signal having an amplitude related in a predetermined manner to the amplitude of the received analog signal; and means responsive to the characteristics of the primary signal for generating a sample clock signal which defines the point at which the amplitude of the primary signal is to be converted to the digital output value, said sample clock signal generating means further comprising:

means for creating a derivative waveform corresponding to the mathematical derivative of the waveform of the primary signal;

zero detection means responsive to the derivative waveform for supplying a zero crossing signal whenever the derivative waveform is approximately zero; and means responsive to the zero crossing signal for establishing the sample clock signal.

21. A transceiver as defined in claim 20 wherein said sample clock signal generating means further comprises:

threshold detector means responsive to the amplitude of the primary signal and operative for supplying a threshold signal whenever the amplitude of the primary signal exceeds a predetermined threshold value;

means for supplying an asynchronous signal upon the simultaneous occurrence of the zero crossing and threshold signals; and synchronizing means for establishing the sample clock signal in response to the asynchronous signal.

22. A transceiver as defined in claim 21 wherein said transmitter means transmits the analog signals over the medium at a predetermined transmit frequency, and wherein:

said synchronizer means supplies the sample clock signal at a frequency which substantially corresponds to the transmit frequency and in a predetermined fixed phase relationship with the primary signals.

23. A transceiver as defined in claim 22 wherein the one analog signal which establishes the sample clock signal comprises:

a calibration signal which is periodically inserted in a serial stream of analog signals transmitted by the transmitter means; and each calibration signal is of a predetermined amplitude and a predetermined phase.

24. A transceiver as defined in claim 23 wherein each calibration signal is immediately preceded and immediately followed by an interval of silence wherein no analog signal is transmitted, and said receiver means further comprises:

means responsive to the calibration signal for determining the amount of residual signal remaining on the medium during the immediately following interval of silence, the residual signal being an inter-symbol interference (ISI) effect created by and related by a predetermined fraction to the preceding calibration signal; and means for eliminating the ISI effect during the conversion of each analog signal into the corresponding digital output value of the analog signal.

25. A transceiver as defined in claim 24 wherein:

the ISI effect is a fractional value established by amplitude of the residual signal in the interval following the calibration signal relative to the amplitude of the calibration signal; and said ISI effect elimination means multiplies the ISI fractional value and a value representative of the preceding converted analog signal to establish the amount of ISI effect on a currently received analog signal.

26. A transceiver as defined in claim 25 wherein:

said ISI elimination means further subtracts the amount of the ISI effect from a value representative of a current received analog signal to supply an ISI compensated value.

27. A transceiver as defined in claim 26 wherein said receiver means further comprises:

means for adjusting the gain of the receiver means to compensate for the effects of signal attenuation or signal amplification by the communication medium.

28. A transceiver as defined in claim 27 wherein said gain adjusting means comprises:

means for supplying a normalized value representative of the ISI compensated value relative to a value representative of the full amplitude of the calibration signal, the normalized value establishing the digital output value.

29. A transceiver as defined in claim 28 wherein:

said means for supplying a normalized value operatively divides the ISI compensated value by a value representative of the amplitude of the calibration signal.

30. A transceiver as defined in claim 29 wherein said receiver means further comprises:

thresholding means receptive of the normalized value and operative for classifying and fractional normalized value into the digital output value.

31. A transceiver as defined in claim 18 wherein said receiver means further comprises;
   means for determining the amount of residual signal effect created by an immediately preceding received analog signal; and
   means for eliminating the residual signal effect during the conversion of each received analog signal to the digital output value.

32. A transceiver as defined in claim 31 wherein said residual signal effect elimination means supplies a compensated signal, and further comprising:
   thresholding means receptive of the compensated signal and operative for classifying any fractional compensated signal into one value of two most closely related digital output values.

33. A transceiver for communicating multiple bits per signal element between a plurality of nodes interconnected by a communication medium of a LAN, comprising:
   transmitter means receptive of a multiple bit digital input value originating at the node, and operative for converting the digital input value into an analog signal having an amplitude and a phase which is defined by a predetermined correlation code to the bit pattern of the digital input value, said transmitter means further transmitting the analog signal over the medium to other nodes of the LAN; and
   receiver means responsive to each received analog signal transmitted by another node over the medium, and operative for converting the amplitude and phase of the received analog signal into a multiple bit digital output value which has a bit pattern that corresponds to the bit pattern of the digital input value, said receiver means using the predetermined correlation code to make the conversion; said receiver means further comprising:
   means for determining the amount of residual signal effect created by one preceding received analog signal which is periodically inserted by the transmitter means in a stream of analog signals transmitted; and
   means for eliminating the residual signal effect during the conversion of each of a plurality of subsequently received analog signals to the digital output value, based on the amount of residual signal effect determined from said one analog signal.

34. A transceiver as defined in claim 33 wherein said residual signal effect elimination means supplies a compensated signal, and further comprising:
   thresholding means receptive of the compensated signal and operative for classifying any fractional compensated signal into one value of the two most closely related digital output values.

35. A transceiver as defined in claim 33 wherein said receiver means further comprises:
   means for supplying a normalized value representative of the received analog signal relative to a predetermined value representative of the signal attenuation or signal amplification by the medium between a transmitting node and a receiving node.

36. A transceiver as defined in claim 35 further comprising:
   thresholding means receptive of the normalized value and operative for classifying any fractional normalized value into one value of the two most closely related digital output values.

37. A transceiver for communicating multiple bits per signal element between a plurality of nodes interconnected by a communication medium of a LAN, comprising:
   transmitter means receptive of a multiple bit digital input value originating at the node, and operative for converting the digital input value into an analog signal having an amplitude and a phase which is defined by a predetermined correlation code to the bit pattern of the digital input value, said transmitter means further transmitting the analog signal over the medium to other nodes of the LAN; and
   receiver means responsive to each received analog signal transmitted by another node over the medium, and operative for converting the amplitude and phase of the received analog signal into a multiple bit digital output value which has a bit pattern that corresponds to the bit pattern of the digital input value, said receiver means using the predetermined correlation code to make the conversion, said receiver means further comprising:
   means for supplying a normalized value representative of the received analog signal relative to a predetermined value representative of the signal attenuation or signal amplification by the medium between a transmitting node and a receiving node.

38. A transceiver as defined in claim 37 further comprising:
   thresholding means receptive of the normalized value and operative for classifying any fractional normalized value into one value of the two most closely related digital output values.

39. A transceiver for communicating multiple bits per signal element between a plurality of nodes interconnected by a communication medium of a LAN, comprising:
   transmitter means receptive of a multiple bit digital input value originating at the node, and operative for converting the digital input value into an analog signal having an amplitude and a phase which is defined by a predetermined correlation code to the bit pattern of the digital input value, said transmitter means further transmitting the analog signal over the medium to other nodes of the LAN; and
   receiver means responsive to each received analog signal transmitted by another node over the medium, and operative for converting the amplitude and phase of the received analog signal into a multiple bit digital output value which has a bit pattern that corresponds to the bit pattern of the digital input value, said receiver means using the predetermined correlation code to make the conversion, said receiver means further comprising:
   time-domain filter means receptive of the received analog signal and operative for supplying a primary signal having an amplitude related in a predetermined manner to the amplitude of the received analog signal.

40. A transceiver as defined in claim 39 wherein:
   the transmitter means transmits each analog signal as a pulse analog signal having predetermined time-domain characteristics; and
   the time-domain filter means produces a maximum output energy in correspondence to a received pulse analog signal having the predetermined time-domain characteristics and substantially attenuates signals from the medium of other characteristics.

41. A transceiver as defined in claim 31 wherein the analog signals on the communication medium are each substantially in the form of a sine pulse waveform.

42. A transceiver as defined in claim 39 wherein said receiver means further comprises:
    means for determining the amount of residual signal effect created by an immediately preceding received analog signal; and
    means for eliminating the residual signal effect during the conversion of each received analog signal to the digital output value.

43. A transceiver as defined in claim 42 wherein said residual signal effect elimination means supplies a compensated signal, and further comprising:
    thresholding means receptive of the compensated signal and operative for classifying any fractional compensated signal into one value of two most closely related digital output values.

44. A transceiver for transmitting and receiving amplitude modulated analog signals occurring at a predetermined transmit frequency on a communication medium which interconnects a plurality of nodes of a LAN, at least some of the analog signals transmitted being calibration signals having a predetermined amplitude, the calibration signals having periodically inserted in a stream of data analog signals, said transceiver comprising an improved receiver means for receiving analog signals from the medium, comprising:
    means responsive to the calibration signal received from the medium and operative for generating an asynchronous signal occurring in a predetermined time relationship to the calibration signal, the synchronous signal generating means generating the asynchronous signal in response to a predetermined analog characteristic of a single received calibration signal;
    synchronizer means responsive to the asynchronous signal and operative for supplying a sample clock signal substantially at the predetermined transmit frequency and in a substantially fixed phase relationship relative to the received analog signals, the synchronizer means establishing the fixed phase relationship in response to the asynchronous signal; and
    conversion means responsive to the sample clock signal for sampling the amplitude of a signal relative to the received analog signal at a point established by the sample clock signal.

45. A transceiver as defined in claim 44 wherein said synchronizer means establishes the fixed phase relationship in response to a single calibration signal.

46. A transceiver as defined in claim 45 further comprising:
    transmitter means for transmitting the analog signals on the medium; and
    means for supplying a reference clock signal to the transmitter means and the receiver means to establish the transmit frequency; and wherein said synchronizer means further comprises:
    means receptive of the reference clock signal for supplying a plurality of phase shifted versions of the reference clock signal, each phase shifted version being phase shifted by an approximately equal amount from the preceding and following phase shifted versions over the period of the reference clock signal; and
    selection means responsive to the asynchronous signal and each of the phase shifted versions for establishing the sample clock signal from one of the phase shifted versions which undergoes a transition within a predetermined time relative to an event defined by the asynchronous signal.

47. A transceiver as defined in claim 46 wherein:
    said means for supplying a plurality of phase shifted versions of the reference clock signal comprises a multi-tap delay line, and each tap of the multi-tap delay means supplies at least one phase shifted version.

48. A transceiver as defined in claim 47 wherein said selection means comprises:
    register means receptive of all of the phase shifted versions and responsive to the asynchronous signal, for setting values therein which correspond to the states of the phase shifted versions upon the occurrence of the asynchronous signal; and
    phase selecting means receptive of the values set in the register and operative for determining from those set values the one phase shifted version from which the sample clock signal is to be derived.

49. A transceiver as defined in claim 48 wherein:
    said phase selecting means determines from the set values which one of the phase shifted versions or an inversion of a phase shifted version is to be supplied as the sample clock signal, and operatively supplies a selection control signal which identifies the one phase shifted version or the inversion thereof which is to be supplied; and further comprising:
    means receptive of the phase shifted versions and operative for supplying the phase shifted versions and for supplying inversions of the phase shifted versions as a selected signal from which the sample clock signal is derived in response to the selection control signal.

50. A transceiver as defined in claim 49 further comprising:
    means receptive of the selected signal and operative for supplying the sample clock signal at a predetermined frequency which is substantially less than the reference clock signal, said sample clock signal supplying means creating a transition in the sample clock signal immediately upon the occurrence of the asynchronous signal and thereafter supplying transitions of the sample clock signal in coincidence with the transitions of the selected one of the phase shifted versions or inversions thereof.

51. A transceiver for transmitting and receiving amplitude modulated analog signals occurring at a predetermined transmit frequency on a communication medium which interconnects a plurality of nodes of a LAN, at least some of the analog signals transmitted being calibration signals having a predetermined amplitude, the calibration signals being periodically inserted in a stream of data analog signals, said transceiver comprising an improved receiver means for receiving analog signals from the medium, comprising:
    means responsive to the received calibration signal for generating an asynchronous signal in a predetermined relationship to the calibration signal;
    synchronizer means responsive to the asynchronous signal and operative for supplying a sample clock signal substantially at the predetermined transmit frequency and in a substantially fixed phase relationship relative to the received analog signals, the synchronizer means establishing the fixed phase relationship in response to the asynchronous signal; and conversion means responsive to the sample clock signal for sampling the amplitude of a signal related to the received analog signal at a point established by the sample clock signal; and wherein:

said conversion means responds to the sample clock signal to convert the maximum amplitude and phase of a primary signal representative of each received analog signal into an initial digital value; and further comprising:

adjusting means responsive to the sample clock signal for adjusting the initial digital value to a different digital output value by substantially eliminating the effect of gain or attenuation from the medium.

52. A transceiver as defined in claim 51 wherein:

said adjusting means substantially eliminates the effect of gain or attenuation by mathematically dividing a value related to the initial digital value by the digital value of the maximum sampled amplitude of a received calibration signal to normalize the digital value before supplying it as the digital output value.

53. A transceiver as defined in claim 52 further comprising:

thresholding means receptive of the normalized digital value for classifying any fractionalized digital value into one value of the two most closely related predetermined digital output values.

54. A transceiver for transmitting and receiving amplitude modulated analog signals occurring at a predetermined transmit frequency on a communication medium which interconnects a plurality of nodes of a LAN, at least some of the analog signals transmitted being calibration signals having a predetermined amplitude, the calibration signals being periodically inserted in a stream of data analog signals, said transceiver comprising an improved receiver means for receiving analog signals from the medium, comprising:

means responsive to the received calibration signal for generating an asynchronous signal in a predetermined relationship to the calibration signal;

synchronizer means responsive to the asynchronous signal and operative for supplying a sample clock signal substantially at the predetermined transmit frequency and in a substantially fixed phase relationship relative to the received analog signals, the synchronizer means establishing the fixed phase relationship in response to the asynchronous signal;

conversion means responsive to the sample clock signal for sampling the amplitude of a signal related to the received analog signal at a point established by the sample clock signal;

conversion means responsive to the sample clock signal for converting the maximum amplitude and phase of each received analog signal into an initial digital value; and adjusting means responsive to the sample clock signal for adjusting the initial digital value to a different digital output value by substantially eliminating the effect of intersymbol interference (ISI).

55. A transceiver as defined in claim 54 wherein each calibration signal is immediately followed by a silent interval wherein no analog signal is transmitted, and further comprising:

means responsive to a residual signal on the medium during the silent interval which follows the calibration signal and operative for latching the value of the residual signal as an ISI value between sequential calibration signals;

means responsive to the calibration signal and operative for latching the maximum amplitude of the calibration signal as a peak value between sequential calibration signals; and means receptive of the ISI value and the peak value for dividing the ISI value by the peak value to obtain an ISI compensation factor.

56. A transceiver as defined in claim 55 wherein:

said adjusting means substantially eliminates the effect of intersymbol interference by mathematically multiplying the digital output value by the value of the ISI compensation factor and subtracting the result of the multiplication from the initial digital value derived from a received analog signal.

* * * * *